United States Patent
Tojima et al.

(10) Patent No.: US 9,651,954 B2
(45) Date of Patent: May 16, 2017

(54) FUEL SUPPLY SYSTEM AND EARTH-MOVING MACHINE

(75) Inventors: Masanori Tojima, Fujisawa (JP); Tsugio Sudou, Tokyo (JP); Koji Takeda, Tama (JP); Kouichi Yamashita, Yokohama (JP)

(73) Assignee: Komatsu Ltd., Tokyo (JP)

( * ) Notice: Subject to any disclaimer, the term of this patent is extended or adjusted under 35 U.S.C. 154(b) by 534 days.

(21) Appl. No.: 14/123,336

(22) PCT Filed: Jun. 19, 2012

(86) PCT No.: PCT/JP2012/065597
§ 371 (c)(1),
(2), (4) Date: Dec. 2, 2013

(87) PCT Pub. No.: WO2012/176756
PCT Pub. Date: Dec. 27, 2012

(65) Prior Publication Data
US 2014/0107849 A1    Apr. 17, 2014

(30) Foreign Application Priority Data
Jun. 21, 2011    (JP) .................. 2011-137584

(51) Int. Cl.
*G05D 7/06* (2006.01)
*B67D 7/04* (2010.01)

(52) U.S. Cl.
CPC ............. *G05D 7/0676* (2013.01); *B67D 7/04* (2013.01)

(58) Field of Classification Search
CPC ...... B67D 7/04; B67D 2007/044; B67D 7/06; B67D 7/32; B65G 61/00; G05D 7/0676;
(Continued)

(56) References Cited

U.S. PATENT DOCUMENTS

| | | | |
|---|---|---|---|
| 6,539,294 B1 | 3/2003 | Kageyama | |
| 8,639,436 B2 * | 1/2014 | Sujan | G06Q 10/04 701/123 |

(Continued)

FOREIGN PATENT DOCUMENTS

| | | |
|---|---|---|
| CN | 201853100 U | 6/2001 |
| CN | 101076490 A | 11/2007 |

(Continued)

OTHER PUBLICATIONS

International Search Report dated Sep. 18, 2012, issued for PCT/JP2012/065597.

*Primary Examiner* — Bao Long T Nguyen
(74) *Attorney, Agent, or Firm* — Locke Lord LLP

(57) ABSTRACT

A fuel supply system includes: a fuel supply facility capable of supplying fuel; an earth-moving machine capable of traveling toward the fuel supply facility; and a control apparatus that acquires execution permission information indicating whether or not fuel can be supplied to the earth-moving machine, and is capable of executing control based on the acquired execution permission information, wherein when the control apparatus determines that fuel cannot be supplied to the earth-moving machine based on the execution permission information at a time of supplying the fuel to the earth-moving machine, the control apparatus executes entry restriction control for restricting an entry to the fuel supply facility by the earth-moving machine.

13 Claims, 12 Drawing Sheets

(58) Field of Classification Search
CPC .... G06Q 50/06; G06Q 2240/00; G06Q 50/28;
G08G 1/0962; G08G 1/0698; G08G
1/096833; G08G 1/13; G07C 5/08; G07C
5/00; G07C 5/008; G01C 21/26
USPC .............................. 701/50, 29.1, 29.3, 31.4
See application file for complete search history.

(56) References Cited

U.S. PATENT DOCUMENTS

| | | | | |
|---|---|---|---|---|
| 9,037,338 | B2* | 5/2015 | Osagawa | E02F 9/205 |
| | | | | 340/968 |
| 2003/0149491 | A1 | 8/2003 | Adachi et al. | |
| 2004/0143377 | A1 | 7/2004 | Sudou | |
| 2011/0137470 | A1* | 6/2011 | Surnilla | G01C 21/26 |
| | | | | 700/282 |
| 2012/0318406 | A1* | 12/2012 | Cajiga | B60S 5/02 |
| | | | | 141/98 |
| 2014/0027013 | A1 | 1/2014 | Tojima et al. | |
| 2014/0277971 | A1* | 9/2014 | Oshiro | B60W 50/14 |
| | | | | 701/51 |

FOREIGN PATENT DOCUMENTS

| | | |
|---|---|---|
| JP | 57-191627 U | 12/1982 |
| JP | 4-1048 A | 1/1992 |
| JP | 05-112396 A | 5/1993 |
| JP | 10-83466 A | 3/1998 |
| JP | 11-296229 A | 10/1999 |
| JP | 2004-185358 A | 7/2004 |
| JP | 2012-236617 A | 12/2012 |
| WO | WO-01/73221 A1 | 10/2001 |
| WO | WO-2006/061039 A2 | 6/2006 |

* cited by examiner

FUEL SUPPLY SYSTEM AND EARTH-MOVING MACHINE

FIELD

The present invention relates to a fuel supply system for supplying fuel to an earth-moving machine and the earth-moving machine.

BACKGROUND

In the related art, a fuel supply system of a construction machine which notifies a base station of information on a residual amount of fuel transmitted from the construction machine has been known as a fuel supply system (for example, see Patent Literature 1). In the fuel supply system of the construction machine, information on the residual amount of fuel is notified to the base station, and thus the base station side perceives the residual amount of fuel in the construction machine to take measures of the fuel supply.

CITATION LIST

Patent Literature

Patent Literature 1: WO 01-073221 A

SUMMARY

Technical Problem

However, the fuel supply system of the related art is configured to smoothly operate the construction machine by perceiving the residual amount of fuel in the construction machine and to select an optimum fuel supply station for the construction machine, but there is no idea of traveling the construction machine toward the fuel supply station. Therefore, in the technique of Patent Literature 1, it is difficult to avoid influences in a case where an earth-moving machine designed for mining and quarrying travels toward a fuel supply facility and then the fuel is not supplied to the earth-moving machine by the fuel supply facility. Specifically, upon supplying the fuel to the earth-moving machine, there are cases of not performing the supply of fuel to the earth-moving machine. For example, a dump truck as a kind of the earth-moving machine may be in a course of loading loads, or the fuel may not remain in the fuel supply facility. In this case, even though the earth-moving machine travels toward the fuel supply facility, since the fuel is not supplied to the earth-moving machine, it causes a large loss of productivity at the time of not supplying the fuel from the fuel supply facility.

The present invention is to provide the fuel supply system capable of supplying the fuel without a decrease in productivity of the earth-moving machine and to provide the earth-moving machine.

Solution to Problem

According to the present invention, a fuel supply system comprises: a fuel supply facility capable of supplying fuel; an earth-moving machine capable of traveling toward the fuel supply facility; and a control apparatus that acquires execution permission information indicating whether or not fuel can be supplied to the earth-moving machine, and is capable of executing control based on the acquired execution permission information, wherein when the control apparatus determines that fuel cannot be supplied to the earth-moving machine based on the execution permission information at a time of supplying the fuel to the earth-moving machine, the control apparatus executes entry restriction control for restricting an entry to the fuel supply facility by the earth-moving machine.

In this case, it is preferable that the control apparatus controls the earth-moving machine to execute entry operation restricting control for restricting an entry operation of the earth-moving machine, which enters the fuel supply facility, as the entry restriction control.

In this case, it is preferable that the fuel supply system according, further comprises: a notification apparatus capable of notifying information, wherein the control apparatus controls the notification apparatus to execute entry restriction notifying control for notifying the earth-moving machine of warning information on the restriction of the entry to the fuel supply facility by the earth-moving machine, as the entry restriction control.

In this case, it is preferable that the fuel supply system, further comprises: a gate apparatus that restricts the entry of the earth-moving machine to the fuel supply facility, wherein the control apparatus controls the gate apparatus to execute gate restriction operating control to restrict the entry of the earth-moving machine to the fuel supply facility, as the entry restriction control.

In this case, it is preferable that the earth-moving machine includes a loading unit that loads a load and further includes a load detection device capable of detecting whether or not the load is loaded on the loading unit, as loading information, and the control apparatus acquires the loading information as the execution permission information, and when the control apparatus determines that the load is loaded on the loading unit based on the loading information, the control apparatus determines that fuel cannot be supplied to the earth-moving machine to execute the entry restriction control.

In this case, it is preferable that the load detection device includes at least one of a loaded-amount detection device that detects a loaded amount of the load which is loaded on the loading unit, an imaging device that takes an image of the load which is loaded on the earth-moving machine, and a weight measurement device that measures a weight of the earth-moving machine.

In this case, it is preferable that the control apparatus dispatches the earth-moving machine toward an unloading area when the control apparatus determines that the load is loaded on the loading unit based on the loading information and dispatches the earth-moving machine toward the fuel supply facility when the control apparatus determines that the load is not loaded on the loading unit based on the loading information.

In this case, it is preferable that the fuel supply facility includes a facility-side fuel tank that accumulates the fuel and a facility-side fuel amount detector capable of detecting an amount of the fuel accumulated in the facility-side fuel tank, as facility-side fuel amount information, and the control apparatus acquires the facility-side fuel amount information as the execution permission information and when the control apparatus determines that fuel does not remain based on the facility-side fuel amount information, the control apparatus determines that fuel cannot be supplied to the earth-moving machine to execute the entry restriction control.

In this case, it is preferable that the fuel supply facility includes a fuel supply-vehicle presence detector capable of detecting a presence or absence of a fuel supply vehicle that supplies the fuel to the earth-moving machine, as fuel supply-vehicle presence information, and the control apparatus acquires the fuel supply-vehicle presence information as the execution permission information and when the control apparatus determines that the fuel supply vehicle is not present in the fuel supply facility based on the fuel supply-vehicle presence information, the control apparatus determines that fuel cannot be supplied to the earth-moving machine to execute the entry restriction control.

In this case, it is preferable that the fuel supply facility includes an operation status detector capable of detecting an operation status of the fuel supply facility due to the supply of the fuel to the earth-moving machine, as operation information, and the control apparatus acquires the operation information as the execution permission information and when the control apparatus determines that the fuel supply facility is in a full state based on the operation information, the control apparatus determines that fuel cannot be supplied to the earth-moving machine to execute the entry restriction control.

In this case, it is preferable that the fuel supply facility includes an operation status detector capable of detecting an operation status of the fuel supply facility due to the supply of the fuel to the earth-moving machine, as operation information, the earth-moving machine includes a loading unit that loads load and further includes a load detection device capable of detecting whether or not the load is loaded on the loading unit, as loading information, and the control apparatus acquires the loading information and the operation information as the execution permission information and when the control apparatus determines that the load is loaded on the loading unit based on the loading information or when the control apparatus determines that the fuel supply facility is in a full state based on the operation information, the control apparatus determines that fuel cannot be supplied to the earth-moving machine to execute the entry restriction control.

According to the present invention, an earth-moving machine capable of traveling toward a fuel supply facility that supplies fuel, the machine comprises: a control unit that acquires execution permission information indicating whether or not fuel can be supplied to the earth-moving machine and is capable of executing control based on the acquired execution permission information, wherein when the control unit determines that fuel cannot be supplied based on the execution permission information at a time of supplying the fuel to the earth-moving machine, the control unit executes entry restriction control for restricting an entry to the fuel supply facility.

In this case, it is preferable that the control unit executes entry operation restricting control for restricting an entry operation of entering the fuel supply facility, as the entry restriction control.

In this case, it is preferable that the earth-moving machine, further comprises: a notification unit capable of notifying information, wherein the control unit controls the notification unit to execute entry restriction notifying control for notifying an operator of warning information on the restriction of the entry to the fuel supply facility, as the entry restriction control.

In this case, it is preferable that the earth-moving machine, further comprises: a loading unit that loads load; and a load detector capable of detecting whether or not the load is loaded on the loading unit, as loading information, wherein the control unit acquires the loading information as the execution permission information and when the control unit determines that the load is loaded on the loading unit based on the loading information, the control unit determines that fuel cannot be supplied to execute the entry restriction control.

In this case, it is preferable that when the control unit determines that the load is loaded on the loading unit based on the loading information, the control unit dispatches the earth-moving machine toward an unloading area and when the control unit determines that the load is not loaded on the loading unit based on the loading information, the control unit dispatches the earth-moving machine toward the fuel supply facility.

Advantageous Effects of Invention

According to a fuel supply system and an earth-moving machine of the present invention, when the supply of fuel to the earth-moving machine is not executable, since the entry to the fuel supply facility by the earth-moving machine can be restricted, it is possible to restrain the decrease in productivity due to the traveling of the earth-moving machine toward the fuel supply facility.

DESCRIPTION OF EMBODIMENTS

Hereinafter, a fuel supply system and an earth-moving machine according to the present invention will be described with reference to the accompanying drawings. Moreover, the present invention is not limited by following embodiments. In addition, constituent elements in the following embodiments include those that can easily be substituted by a person in the art and that are substantially the same. Further, a fuel supply system provided with an earth-moving machine is described in first and eighth embodiments, and the earth-moving machine is described in ninth and tenth embodiments.

First Embodiment

The fuel supply system of a first embodiment is incorporated into a load transport system. This load transport system is a system for transporting loads which are loaded onto the earth-moving machine. As the earth-moving machine, construction machinery or mining machinery is applied. In the first embodiment, a case where a transport machine such as a dump truck serving as the mining machinery is applied as the earth-moving machine will be described.

<Configuration of Load Transport System>

Figure 1:
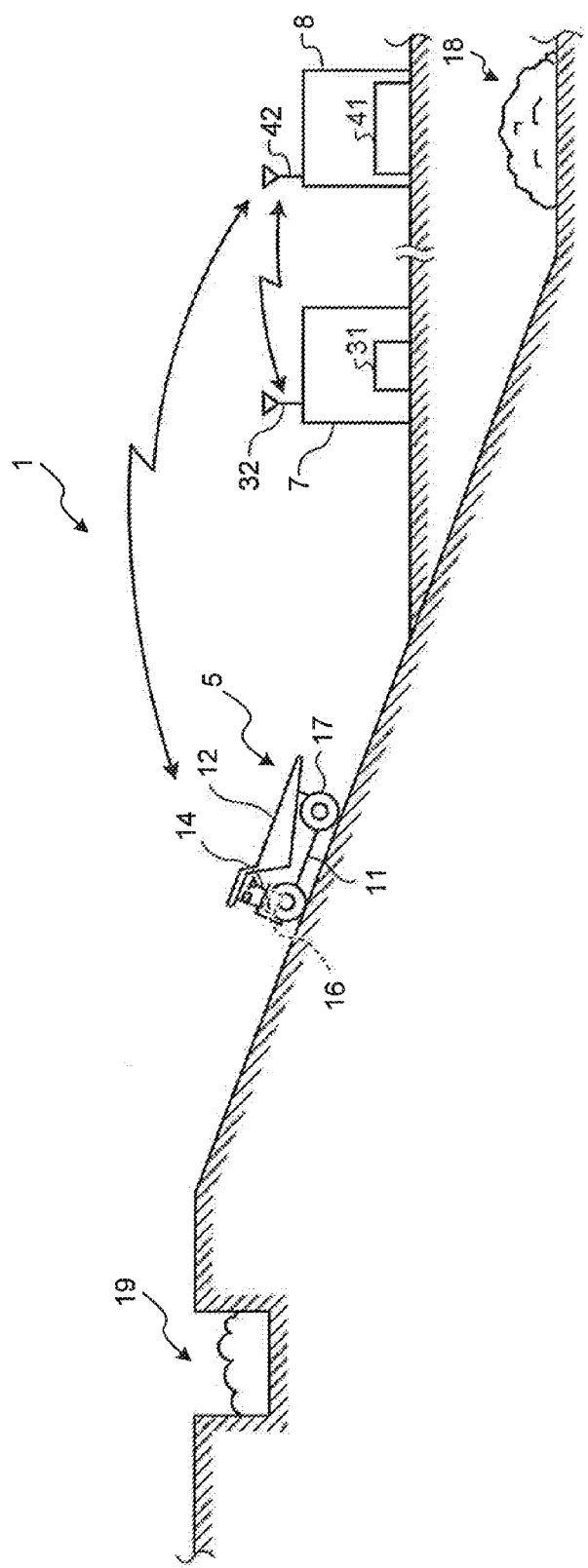
FIG. 1 is a schematic framework schematically illustrating a load transport system to which a fuel supply system of a first embodiment is applied.

FIG. 1 is a schematic framework illustrating schematically a load transport system to which the fuel supply system of the first embodiment is applied. As illustrated in FIG. 1, a load transport system 1 is used in a mine and includes a transport machine 5, a fuel supply facility 7, and a central management control facility 8 which manages and controls the transport machine 5 and the fuel supply facility 7.

The transport machine 5 is, for example, a dump truck and is capable of traveling while loading the loads. The transport machine 5 includes a vehicle body 11, a vessel 12, a communication unit 14, a position detection unit 15 (see FIG. 3), and a control unit 16. The control unit 16 is, for example, a microcomputer unit and includes a processor and a storage device.

The vehicle body 11 generates power using fuel in an engine and generates the power using electric power in a motor. Specifically, the vehicle body 11 is equipped with the engine and the motor, and the engine and the motor are connected to each other. Thus, the electric power is generated by the power of the engine, and the generated electric power is supplied to the motor. For this reason, the vehicle body 11 can travel by transmitting the power generated by the motor to driving wheels 17. The vessel 12 is configured to load the loads and is disposed on a top of the vehicle body 11. A discharging earth such as a mined ore, rock, or soil as the loads is loaded on the vessel 12. Further, the vessel 12 may be a detachable configuration with respect to the vehicle body 11.

The communication unit 14 is connected to the control unit 16 to perform radio communication between the control unit 16 of the transport machine 5 and the central management control facility 8. The communication unit 14 acquires information transmitted from the central management control facility 8 to output toward the control unit 16 and acquires information output from the control unit 16 to transmit toward the central management control facility 8. The position detection unit 15 uses, for example, a Global Positioning System (GPS) to recognize a position of the transport machine 5. The position detection unit 15 is connected to the control unit 16 to output the detected positional information to the control unit 16. Moreover, the control unit 16 controls an operation of each part such as the engine of the transport machine 5 and transmits the acquired information such as the positional information to the central management control facility 8 through the communication unit 14.

Figure 2:
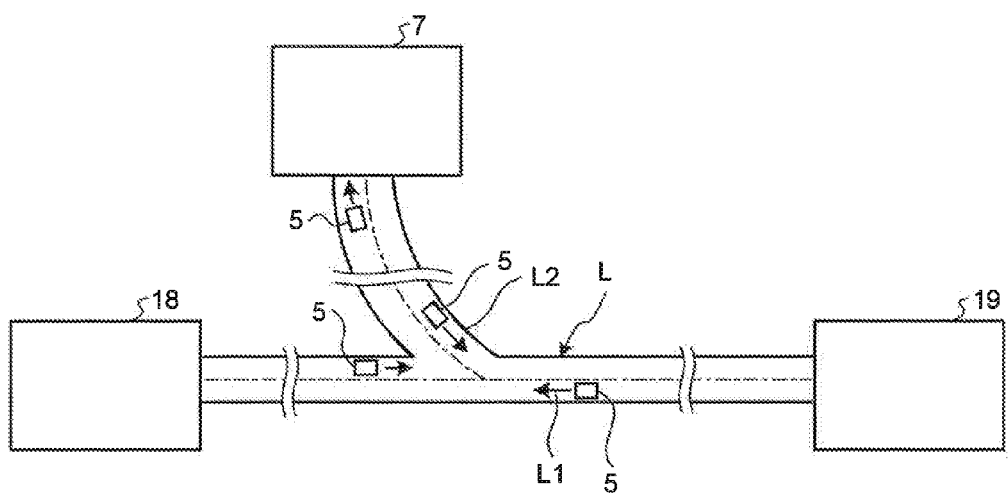
FIG. 2 is an explanatory diagram of a traveling path along which a transport machine of the first embodiment travels.

FIG. 2 is an explanatory diagram of a traveling path along which the transport machine of the first embodiment travels. The transport machine 5 configured as described above transports the loads along a predetermined traveling path L. As illustrated in FIG. 2, the traveling path L along which the transport machine 5 travels is configured so that, for example, an advancing path of the transport machine 5 is a left side in a width direction of the traveling path L and includes a traveling path L1 and a traveling path L2. The traveling path L1 is a traveling path for connecting a loading area 18 which loads the loads with an earth discharging area (unloading area) 19 which unloads the loads and is made up of a forward path passing in a direction toward the earth discharging area 19 from the loading area 18 and a backward path passing in a direction toward the loading area 18 from the earth discharging area 19. The traveling path L2 is a traveling path which passes in a direction toward the fuel supply facility 7 by branching from the traveling path L1 and is made up of a forward path passing in a direction toward the fuel supply facility 7 from the traveling path L1 and a backward path passing in a direction toward the traveling path L1 from the fuel supply facility 7. Further, the transport machine 5 travels back and forth between the loading area 18 and the earth discharging area (unloading area) 19 along the traveling path L1. In addition, the transport machine 5 travels toward the fuel supply facility 7 along the traveling path L2, when the fuel is consumed by traveling of the transport machine 5 and thus the residual amount of fuel becomes less.

Figure 3:
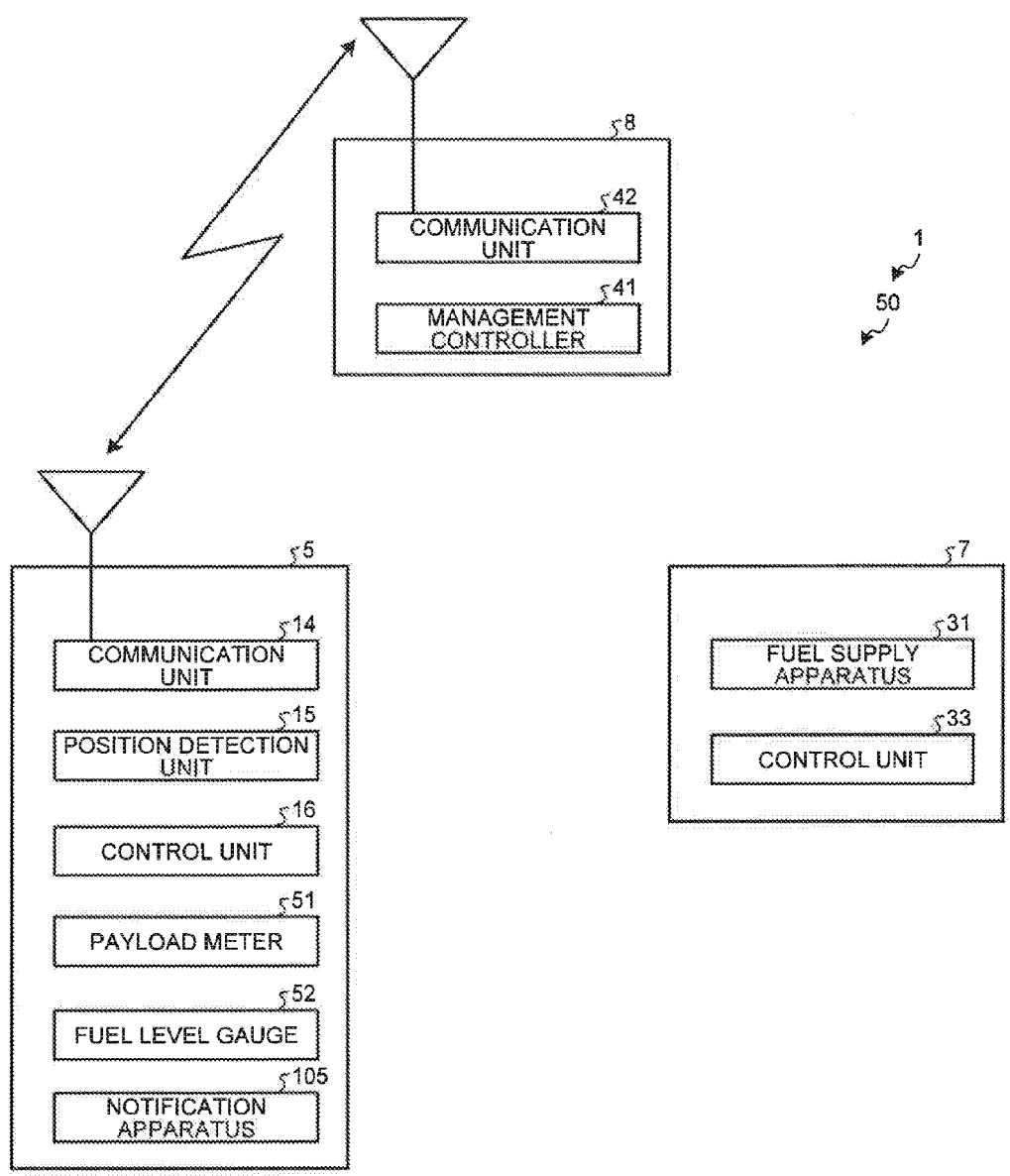
FIG. 3 is a block diagram illustrating a configuration of the fuel supply system of the first embodiment.

The fuel supply facility 7 includes a fuel supply apparatus 31 and a control unit 33 (see FIG. 3). When a fuel supply hose (not illustrated) is connected to a fuel supply inlet of the transport machine 5 came into the fuel supply facility 7 by a worker, the fuel supply apparatus 31 supplies the fuel to the transport machine 5 through the fuel supply inlet. The control unit 33 acquires operation information which is information of operation status of the fuel supply apparatus 31 to monitor the operation status of the fuel supply apparatus 31 based on the acquired operation information.

The central management control facility 8 is provided in a different location from the transport machine 5 and the fuel supply facility 7 and is configured to monitor the operation status of the transport machine 5. The central management control facility 8 includes a management controller 41 and a communication unit 42. The communication unit 42 performs radio communication between the transport machine 5 and the management controller 41 to transmit and receive information such as positional information, fuel amount information to be described later, and execution permission information. The management controller 41 performs control based on the acquired information through the communication unit 42. Specifically, the management controller 41 recognizes a position of the transport machine 5 or manages the operation status of the transport machine 5 based on the above-described information transmitted from the transport machine 5.

Accordingly, the load transport system 1 manages the operation status of the transport machine 5 and performs the control based on the managed operation status of the transport machine 5, using the central management control facility 8. For example, the operation status of the transport machine 5 is a status for supplying the fuel to the transport machine 5. Details will be described below, but, in the load transport system 1, the central management control facility 8 determines that there is a need to supply the fuel to the transport machine 5 from the operation status of the transport machine 5. Then, the central management control facility 8 transmits permission information on the notification of the supply of fuel toward the transport machine 5, to the control unit 16 of the transport machine 5 through the communication unit 42 of the central management control facility 8 and the communication unit 14 of the transport machine 5. The control unit 16 executes the control based on the acquired permission information to give the notification of the fuel supply toward the transport machine 5. Hereinafter, a fuel supply system 50 for supplying the fuel to the transport machine 5 will be described in detail with reference to FIG. 3. Further, the load transport system 1 performs control of giving the notification of a road surface condition of the traveling path L in addition to the control of notifying the supply of fuel to the transport machine 5 as an example.

<Configuration of Fuel Supply System>

FIG. 3 is a block diagram illustrating a configuration of the fuel supply system of the first embodiment. The fuel supply system (fuel supply system) 50 for supplying the fuel to the transport machine 5 is incorporated into the load transport system 1 configured as described above.

The fuel supply system 50 is a system for supplying the fuel to the transport machine 5 entering the fuel supply facility 7 from the fuel supply apparatus 31. As illustrated in FIG. 3, the fuel supply system 50 is made up of the above-described transport machine (earth-moving machine) 5, the above-described fuel supply facility 7, and the above-described central management control facility (control apparatus) 8.

The central management control facility 8 is configured to acquire supply information which is information on whether or not to supply the fuel to the transport machine 5 and the execution permission information which is information on whether or not the fuel supply toward the transport machine 5 is executable. The supply information and the execution permission information are input to the management controller 41 through the communication unit 42.

In addition, the fuel supply system 50 is provided with a load detection apparatus which detects whether or not the loads are loaded onto the transport machine 5, a fuel level gauge 52 which detects the fuel amount of the transport machine 5, and a notification apparatus 105 which notifies information such as a road surface condition of the traveling path L. As an example, as the load detection apparatus, a payload meter (loaded-amount detection apparatus) 51 for detecting a loaded-amount of the loads which are loaded onto the transport machine 5 is used. The payload meter 51, the fuel level gauge 52, and the notification apparatus 105 are provided in the transport machine 5.

For example, the payload meter 51 detects the loaded-amount of the loads, which are loaded onto the transport machine 5, based on a detection pressure of a pressure sensor for detecting pressure of a suspension which supports the driving wheels 17 of the vehicle body 11. This payload meter 51 is connected to the control unit 16 to output the detected loaded-amount as loading information to the control unit 16. The loading information is information for determining whether or not the loads are loaded on the vessel 12 acting as a loading unit. The control unit 16 transmits the input loading information acting as the execution permission information to the central management control facility 8 through the communication unit 14 and the communication unit 42.

The fuel level gauge 52 measures the amount of fuel accumulated in a fuel tank provided in the vehicle body 11. The fuel level gauge 52 is connected to the control unit 16 to output the detected fuel amount as fuel amount information to the control unit 16. The control unit 16 transmits the input fuel amount information to the central management control facility 8 through the communication unit 14 and the communication unit 42, as the supply information.

The notification apparatus 105 is, for example, a display monitor and is provided in an operator's cab of the transport machine 5. The notification apparatus 105 is connected to the control unit 16 to display so as to notify an operator of the transport machine 5 of the information input from the control unit 16. The information displayed on the notification apparatus 105 has become necessary information for the operator. The information includes, for example, the loading information detected by the payload meter 51, the fuel amount information detected by the fuel level gauge 52, the road surface information on the road surface condition of the traveling path L transmitted from the management controller 41, warning information to be described later, and permission information to be described later.

In the central management control facility 8, the fuel amount information and the loading information are input to the management controller 41 through the communication unit 42. When acquiring the input fuel amount information, the management controller 41 determines whether or not to supply the fuel to the transport machine 5 based on the acquired fuel amount information. In addition, when acquiring the input loading information, the management controller 41 determines whether or not the loads are loaded on the transport machine 5 based on the acquired loading information, and thus determines whether or not the fuel supply to the transport machine 5 is executable. That is, when the management controller 41 determines that the loads are loaded on the transport machine 5, it is determined that the fuel supply to the transport machine 5 is not executable. On the other hand, when the management controller 41 determines that the loads are not loaded on the transport machine 5, it is determined that the fuel supply to the transport machine 5 is executable. Further, when determining that the fuel supply toward the transport machine 5 is not executable, the management controller 41 executes entry restriction control for restricting an entry of the transport machine 5 to the fuel supply facility 7. On the other hand, when determining that the fuel supply to the transport machine 5 is executable, the management controller 41 executes entry allowance control for allowing an entry of the transport machine 5 to the fuel supply facility 7.

Specifically, when the management controller 41 determines to supply the fuel to the transport machine 5 from the acquired fuel amount information, if it is determined that the loads are loaded on the transport machine 5 based on the acquired loading information, the management controller 41 executes entry restriction notifying control for notifying the notification apparatus 105 of warning information on the restriction of the entry of the transport machine 5 to the fuel supply facility 7 as the entry restriction control. Thus, the warning information is displayed on the notification apparatus 105, and the operator of the transport machine 5 can visually recognize the warning information displayed on the notification apparatus 105 to perform appropriate operation of allowing the transport machine 5 to travel toward the earth discharging area 19.

On the other hand, when determining to supply the fuel to the transport machine 5 based on the acquired fuel amount information, if it is determined that the loads are not loaded on the transport machine 5 based on the acquired loading information, the management controller 41 executes entry allowance notifying control for notifying the notification apparatus 105 of permission information on the allowance of the entry of the transport machine 5 to the fuel supply facility 7 as the entry allowance control. Thus, the permission information is displayed on the notification apparatus 105, and the operator of the transport machine 5 can visually recognize the permission information displayed on the notification apparatus 105 to perform appropriate operation of allowing the transport machine 5 to travel toward the fuel supply facility 7.

In addition, the notification apparatus 105 displays the warning information and the permission information. As the warning information, however, the notification apparatus 105 may display a warning message such as "no entry" while displaying a red background representing the entry restriction on the display monitor, for example. In contrast, as the permission information, the notification apparatus 105 may display a permission message such as "entry permission" while displaying a green background representing the entry permission on the display monitor, for example. Further, without being limited to these configurations, the notification apparatus 105 may be configured using a plurality of lamps. That is, the plurality of lamps include at least a green lamp and a red lamp, and the red lamp may be turned on as the warning information and the green lamp may be turned on as the permission information. In addition, the notification apparatus 105 notifies the operator of the transport machine 5 by displaying the warning information and the permission information, but is not limited to this configuration. For example, by using a speaker provided in the operator's cab of the transport machine 5 as the notification apparatus 105, the notification apparatus 105 may notify the operator of the transport machine 5 by issuing a voice guide from the speaker.

<Control Operation of Fuel Supply System>

Figure 4:
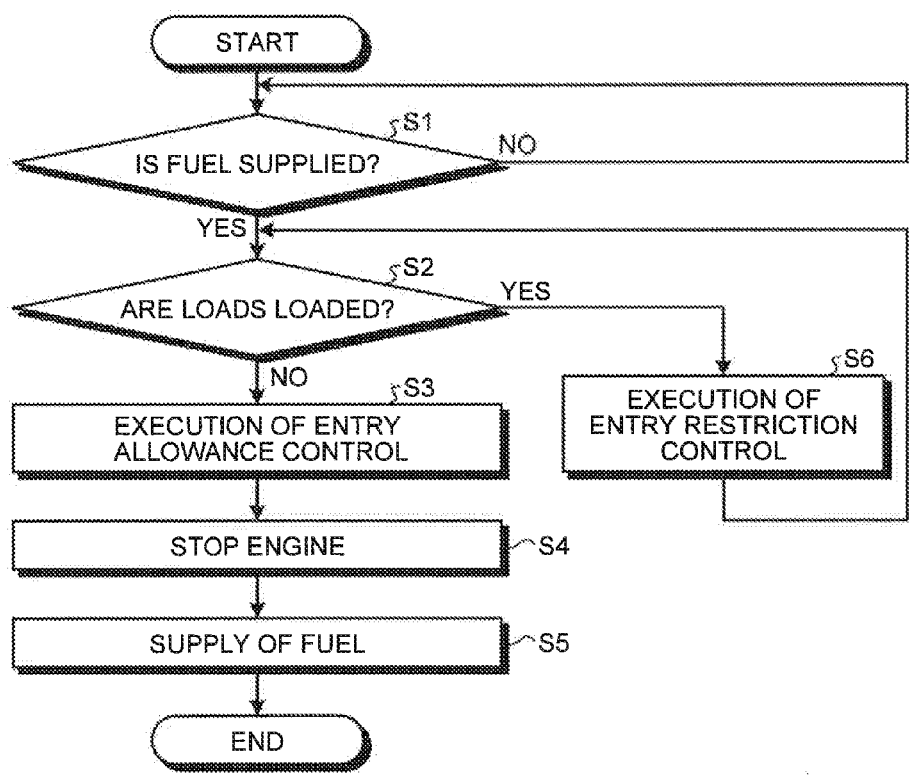
FIG. 4 is a flowchart related to a control operation of the fuel supply system of the first embodiment.

FIG. 4 is a flowchart relating to the control operation of the fuel supply system of the first embodiment. The fuel supply system 50 having the above-described configuration will be described with reference to FIG. 4. The control unit 16 of the transport machine 5 acquires the loading information from the payload meter 51 and acquires the fuel amount information from the fuel level gauge 52. The control unit 16 transmits the acquired loading information and fuel amount information to the central management control facility 8 through the communication unit 14. The transmitted fuel amount information and loading information are input to the management controller 41 through the communication unit 42 of the central management control facility 8 and thus the management controller 41 acquires the fuel amount information and the loading information. The management controller 41 determines whether or not to supply the fuel to the transport machine 5, based on the acquired fuel amount information (step S1).

When the management controller 41 determines to supply the fuel to the transport machine 5 based on the acquired fuel amount information (Yes in step S1) based on the acquired fuel amount information, it determines whether or not to load the loads on the vessel 12 of the transport machine 5 (step S2) based on the loading information. On the other hand, when the management controller 41 determines not to supply the fuel to the transport machine 5 based on the acquired fuel amount information (No in step S1), the process performs again step S1.

When the management controller 41 determines that the loads are loaded on the vessel 12 of the transport machine 5 (Yes in step S2) based on the loading information, it executes the entry restriction notifying control for notifying the operator of the transport machine 5 of the warning information (step S6: execution of entry restriction control). When the entry restriction notifying control is executed, the management controller 41 transmits the warning information to the transport machine 5 through the communication unit 42. The communication unit 14 of the transport machine 5 acquires the transmitted warning information to output the acquired warning information to the control unit 16. When the control unit 16 acquires the warning information output from the communication unit 14, it displays the warning information on the notification apparatus 105. Further, when the notification apparatus 105 displays the warning information, since the operator of the transport machine 5 perceives that the entry to the fuel supply facility 7 is restricted, it is possible to allow the transport machine 5 to travel toward the earth discharging area 19. Then, after executing step S6, the process proceeds to step S2, and the management controller 41 executes repeatedly steps S6 and S2 until the loads of the transport machine 5 are unloaded.

In step S2, when the management controller 41 determines not to load the loads on the vessel 12 of the transport machine 5 based on the acquired loading information (No in step S2), it executes the entry allowance notifying control for notifying the operator of the transport machine 5 of the entry permission information (step S3: execution of entry allowance control). When the entry allowance notifying control is executed, the management controller 41 transmits the permission information to the transport machine 5 through the communication unit 42. The communication unit 14 of the transport machine 5 acquires the transmitted permission information to output the acquired permission information to the control unit 16. When the control unit 16 acquires the permission information output from the communication unit 14, it displays the permission information on the notification apparatus 105. Further, when the notification apparatus 105 displays the permission information, since the operator of the transport machine 5 perceives that the entry to the fuel supply facility 7 is allowed, it is possible to allow the transport machine 5 to travel toward the fuel supply facility 7. After this, when the transport machine 5 enters the fuel supply facility 7 to stop at a position capable of the fuel supply by the fuel supply apparatus 31, the operator of the transport machine 5 stops the operation of the engine of the transport machine 5 (step S4). Further, when the worker connects the fuel supply hose (not illustrated) to the fuel supply inlet of the transport machine 5 in which the operation of the engine is stopped, the fuel supply apparatus 31 of the fuel supply facility 7 supplies the fuel to the transport machine 5 (step S5).

As described above, according to the first embodiment, when the loads are loaded on the transport machine 5, the management controller 41 can notify the warning information that the fuel supply toward the transport machine 5 is not executable, to the operator of the transport machine 5 from the notification apparatus 105. Therefore, the operator of the transport machine 5 allows the transport machine 5 not to travel toward the fuel supply facility 7 but to travel toward the earth discharging area 19. Thus, the fuel supply system 50 of the first embodiment can restrain the decrease in productivity due to the traveling of the transport machine 5 toward the fuel supply facility 7. In addition, since the transport machine 5 does not enter the fuel supply facility 7 in a loaded state of the loads, it is possible to restrain the damage to the fuel supply facility 7 due to a falling of the loads and to reduce time and effort for sweeping the fallen loads. The fuel supply is restricted in the fuel supply facility 7 at the time of sweeping the fallen loads, but in the first embodiment, since the time and effort for sweeping the fallen loads are reduced, it is possible to restrain the restriction of the fuel supply in the fuel supply facility 7 and to restrain the decrease in productivity, as a result. In addition, since the loads are prevented from falling onto the fuel supply facility 7, it is possible to avoid the decrease in productivity due to the fallen loads which obstruct the entry of other transport machines 5 to the fuel supply facility 7.

In addition, according to the first embodiment, the management controller 41 may determine whether or not the loads are loaded on the transport machine 5, based on the loaded-amount of the loads detected by the payload meter 51. For this reason, it is possible to effectively utilize the existing payload meter 51 provided in the transport machine 5.

In the first embodiment, further, the warning information and the permission information are displayed on the notification apparatus 105, but may display the warning message such as "no entry" and a message for prompting an earth discharging work such as "please go to the earth discharging area" toward to the operator of the transport machine 5, as the warning information. In addition, as the permission information, the permission message such as "permission to enter" and a message for prompting a fuel supply work such as "please go to the fuel supply facility" are displayed toward to the operator of the transport machine 5.

Second Embodiment

Figure 5:
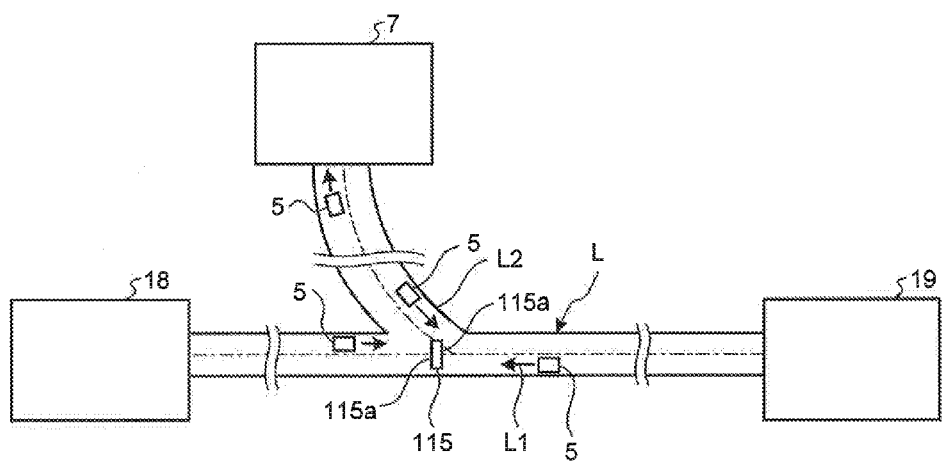
FIG. 5 is an explanatory diagram of a traveling path along which a transport machine of a second embodiment travels.
Figure 6:
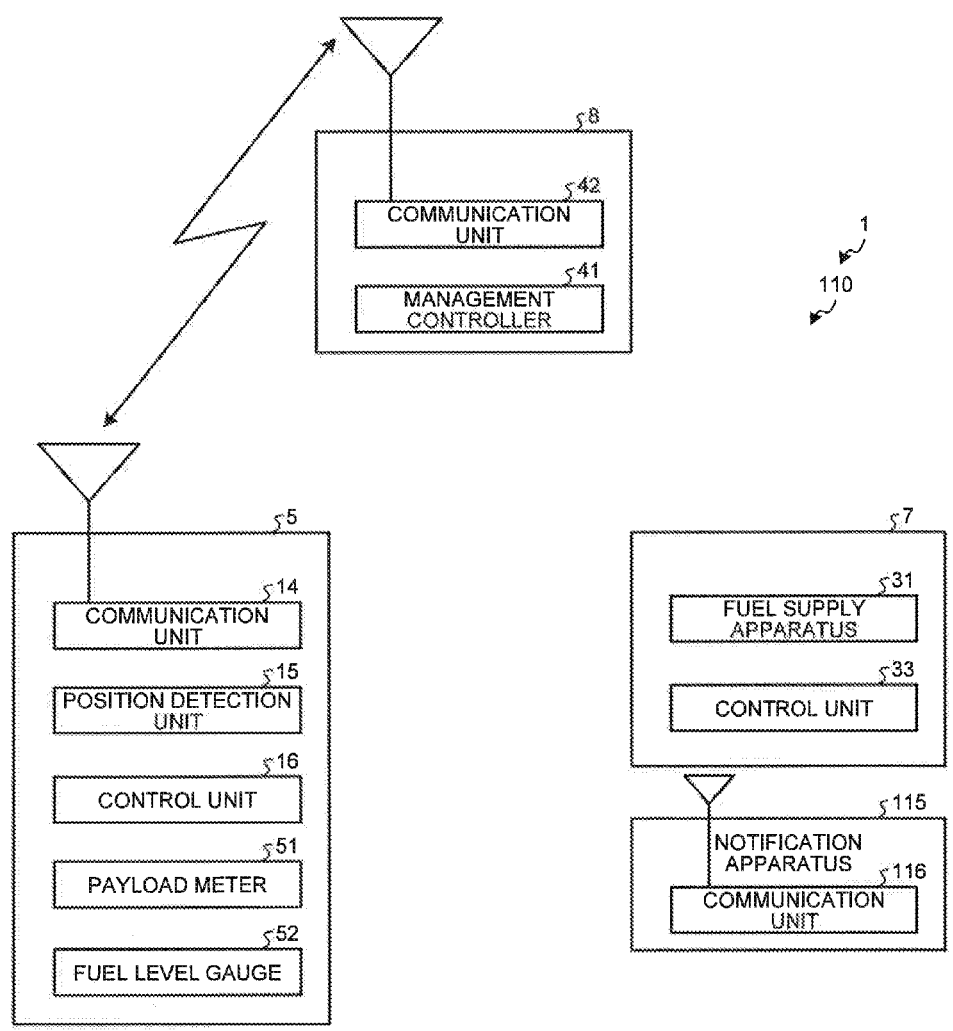
FIG. 6 is a block diagram illustrating a configuration of the fuel supply system of the second embodiment.

A fuel supply system 110 of the second embodiment will be described below with reference to FIGS. 5 and 6. FIG. 5 is an explanatory diagram of a traveling path along which a transport machine of the second embodiment travels and FIG. 6 is a block diagram illustrating a configuration of the fuel supply system of the second embodiment. In the fuel supply system 110 of the second embodiment, further, only portions different from those described in the fuel supply system 50 of the first embodiment will be described so as to avoid the redundant description. The notification apparatus 105 is provided in the operator's cab of the transport machine 5 as the display monitor in the fuel supply system 50 of the first embodiment, but a notification apparatus 115 is provided outside the transport machine 5 in the fuel supply system 110 of the second embodiment.

<Configuration of Fuel Supply System>

As illustrated in FIG. 5, the notification apparatus 115 is a traffic light or a security alarm such as an electronic billboard provided at a branch road of a traveling path L1 and a traveling path L2 to notify the operator for operating the transport machine 5 of the information. The information is, for example, road surface information, warning information, and permission information. The notification apparatus 115 is provided above the transport machine 5 for traveling along the traveling path L1 and at a position which does not interfere with the traveling of the transport machine 5. In addition, the notification apparatus 115 has a face perpendicular to an extending direction of the traveling path L1 as a display face 115a so as to improve visibility toward the operator for operating the transport machine 5. Further, the display face 115a may be provided on both surfaces so as to be visually recognized from the forward path and the backward path of the traveling path L1.

As illustrated in FIG. 6, the notification apparatus 115 includes a communication unit 116 capable of communicating with the communication unit 42 of the central management control facility 8. The notification apparatus 115 is controlled by the management controller 41 of the central management control facility 8 through the communication unit 42 and the communication unit 116. For this reason, the management controller 41 can display the information necessary for the operator of the transport machine 5 on the notification apparatus 115.

Here, the notification of the information by the notification apparatus 115 is performed when the transport machine 5 is approaching the position at which the operator can visually recognize the information of the notification apparatus 115, preferably. For example, the management controller 41 acquires the position information transmitted from the position detection unit 15 of the transport machine 5 and the identification information such as a unique ID of the transport machine 5 and acquires the position information of the notification apparatus 115. Further, the management controller 41 specifies the transport machine 5 as a notification target based on the identification information and notifies the information when a distance between the specified transport machine 5 and the notification apparatus 115 becomes a predetermined distance or less.

The management controller 41 acquires the loading information detected by the payload meter 51 and the fuel amount information detected by the fuel level gauge 52 from the transport machine 5 through the communication unit 42. When the management controller 41 determines to supply the fuel to the transport machine 5 based on the acquired fuel amount information, if it is determined that the loads are loaded on the transport machine 5 based on the acquired loading information, the management controller 41 executes entry restriction notifying control for notifying the notification apparatus 115 of warning information on the restriction of the entry of the transport machine 5 to the fuel supply facility 7 as the entry restriction control. The entry restriction notifying control is executed, and when the distance between the transport machine 5 and the notification apparatus 115 is the predetermined distance or less, the management controller 41 displays the warning information on the notification apparatus 115 to notify the operator of the transport machine 5 of the warning information.

On the other hand, when the management controller 41 determines to supply the fuel to the transport machine 5 based on the acquired fuel amount information, if it is determined that the loads are not loaded on the transport machine 5 based on the acquired loading information, the management controller 41 executes entry allowance notifying control for notifying the notification apparatus 115 of permission information on the allowance of the entry of the transport machine 5 to the fuel supply facility 7 as the entry allowance control. The entry allowance notifying control is executed, and when the distance between the transport machine 5 and the notification apparatus 115 is the predetermined distance or less, the management controller 41 displays the permission information on the notification apparatus 115 to notify the operator of the transport machine 5 of the permission information. Further, since the control operation of the fuel supply system 110 is the same as in the first embodiment, the description thereof will be not represented.

Here, when the electronic billboard is applied as the notification apparatus 115, the notification apparatus 115 may notify the warning information and the permission information using a text and a picture. In addition, when the traffic light is applied as the notification apparatus 115, the traffic light includes at least blue signal and red signal, and the warning information may be notified by turning on the red signal and the permission information may be notified by turning on the blue signal. Further, the notification apparatus 115 may generate a warning sound at the time of the notification. Furthermore, even when the management controller 41 utilizes the notification apparatus 115 such as the electronic billboard and the traffic light, the management controller 41 acquires the identification information of the transport machine 5 and specifies the transport machine 5 as the notification target from the identification information so as to notify the specified transport machine 5.

As described above, even in the second embodiment, when the loads are loaded on the transport machine 5, the management controller 41 can notify the operator of the transport machine 5 of the warning information that the fuel supply toward the transport machine 5 is not executable, from the notification apparatus 115. Therefore, the operator of the transport machine 5 allows the transport machine 5 not to travel toward the fuel supply facility 7 but to travel toward the earth discharging area 19. Thus, the fuel supply system 110 of the second embodiment can restrain the decrease in productivity due to the traveling of the transport machine 5 toward the fuel supply facility 7.

Third Embodiment

Figure 7:
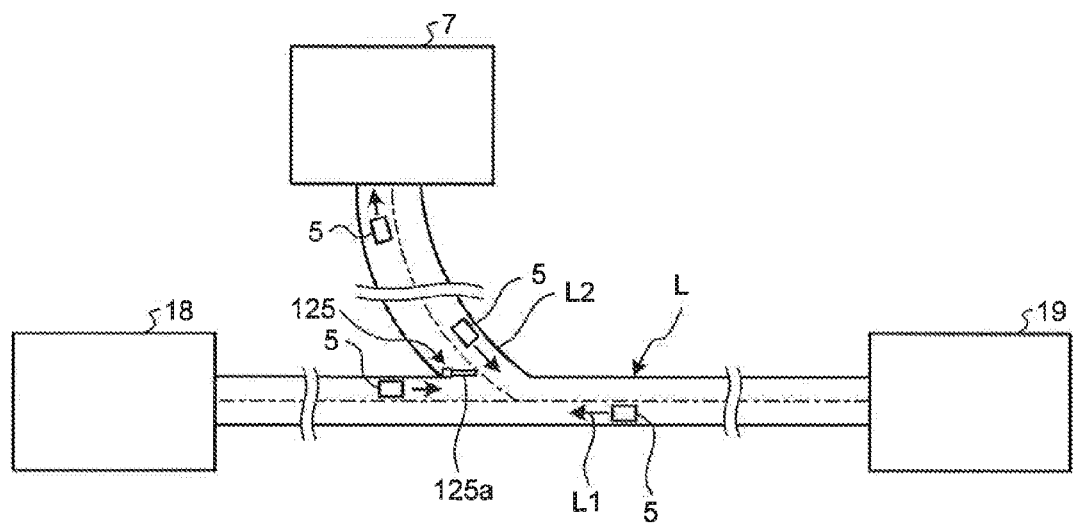
FIG. 7 is an explanatory diagram of a traveling path along which a transport machine of a third embodiment travels.
Figure 8:
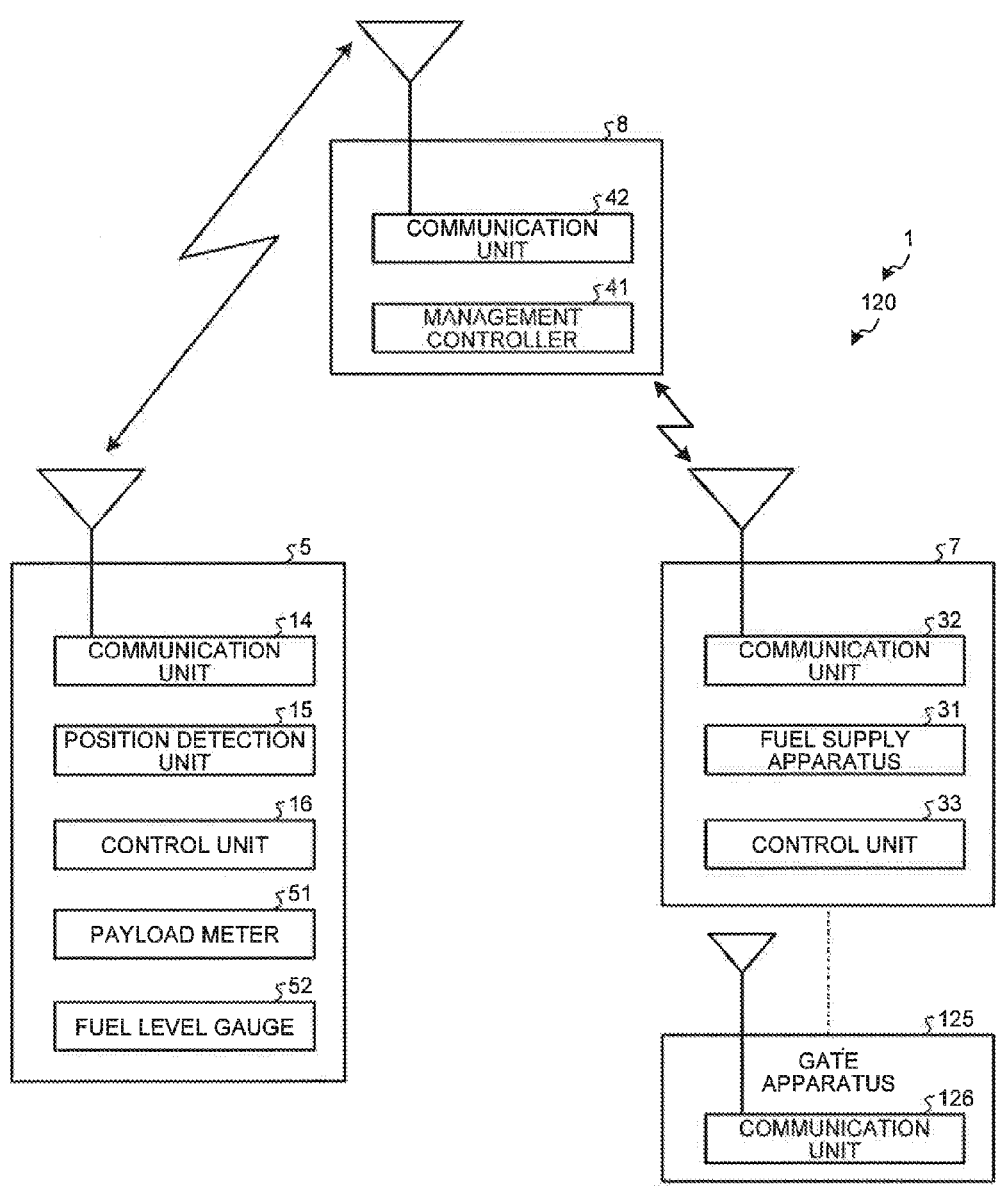
FIG. 8 is a block diagram illustrating a configuration of the fuel supply system of the third embodiment.

A fuel supply system 120 of the third embodiment will be described below with reference to FIGS. 7 and 8. FIG. 7 is an explanatory diagram of a traveling path along which a transport machine of the third embodiment travels and FIG. 8 is a block diagram illustrating a configuration of the fuel supply system of the third embodiment. Further, even in the fuel supply system 120 of the third embodiment, only portions different from those described in the fuel supply system 110 of the second embodiment will be described so as to avoid the redundant description. The notification apparatus 115 is provided outside the transport machine 5 in the fuel supply system 110 of the second embodiment, but a gate apparatus 125 is provided in the fuel supply system 120 of the third embodiment, instead of the notification apparatus 115.

<Configuration of Fuel Supply System>

As illustrated in FIG. 7, the gate apparatus 125 is provided on the traveling path L2 and is configured to restrict the entry of the transport machine 5 to the fuel supply facility 7. At this time, the gate apparatus 125 is disposed in the forward path which goes in a direction toward the fuel supply facility 7 from the traveling path L1 in the traveling path L2. The gate apparatus 125 has openable and closable gate bar 125a. Thus, the entry toward the fuel supply facility 7 is restricted by a closing operation of the gate bar 125a, while the entry toward the fuel supply facility 7 is allowed by an opening operation of the gate bar 125b.

As illustrated in FIG. 8, the gate apparatus 125 includes a communication unit 126 capable of communicating with the communication unit 42 of the central management control facility 8. The gate apparatus 125 is controlled by the management controller 41 of the central management control facility 8 through the communication unit 42 and the communication unit 126. For this reason, the management controller 41 can control the opening and closing operations of the gate apparatus 125.

Here, the opening and closing operations by the gate apparatus 125 are performed when the transport machine 5 is approaching the gate apparatus 125, preferably. For example, the management controller 41 acquires the position information transmitted from the position detection unit 15 of the transport machine 5 and the identification information such as a unique ID of the transport machine 5 and acquires the position information of the gate apparatus 125. Further, the management controller 41 specifies the transport machine 5 as a notification target from the identification information and performs the opening and closing operation by the gate apparatus 125 when a distance between the specified transport machine 5 and the gate apparatus 125 becomes a predetermined distance or less.

The loading information detected by the payload meter 51 and the fuel amount information detected by the fuel level gauge 52 are input to the management controller 41 from the transport machine 5 through the communication unit 42. When the management controller 41 determines to supply the fuel to the transport machine 5 based on the acquired fuel amount information, if it is determined that the loads are loaded on the transport machine 5 based on the acquired loading information, the management controller 41 executes a gate restriction control for restricting the entry of the transport machine 5 to the fuel supply facility 7 by controlling the gate apparatus 125, as the entry restriction control. The gate restriction control is executed, and when the distance between the transport machine 5 and the gate apparatus 125 is the predetermined distance or less, the management controller 41 executes the closing operation of the gate bar 125a of the gate apparatus 125.

On the other hand, when the management controller 41 determines to supply the fuel to the transport machine 5 based on the acquired fuel amount information, if it is determined that the loads are not loaded on the transport machine 5 based on the acquired loading information, the management controller 41 executes gate allowance control for allowing the entry of the transport machine 5 to the fuel supply facility 7 by controlling the gate apparatus 125, as the entry allowance control. The gate allowance control is executed, and when the distance between the transport machine 5 and the gate apparatus 125 is the predetermined distance or less, the management controller 41 executes the opening operation of the gate bar 125a of the gate apparatus 125. Further, since the control operation of the fuel supply system 120 is the substantially same as in the first embodiment except that the gate allowance control may be used in step S3 in FIG. 4 and the gate restriction control may be used in step S6 in FIG. 6, the description thereof will be not represented.

As described above, even in the third embodiment, when the loads are loaded on the transport machine 5, the management controller 41 determines that the fuel supply toward the transport machine 5 is not executable and can restrict the entry of the transport machine 5 to the fuel supply facility 7 by executing the gate restriction control. Therefore, the operator of the transport machine 5 does not travel the transport machine 5 toward the fuel supply facility 7, and thus it is possible to restrain the decrease in productivity due to the traveling of the transport machine 5 toward the fuel supply facility 7.

Fourth Embodiment

A fuel supply system of the fourth embodiment will be described below. Further, even in the fuel supply system of the fourth embodiment, only portions different from those described in the fuel supply systems 110 and 120 of the second and third embodiments will be described so as to avoid the redundant description. In the fuel supply systems 110 and 120 of the second and third embodiments, the central management control facility 8 controls the notification apparatus 115 or the gate apparatus 125 provided outside the transport machine 5 to execute the entry restriction control, but in the fuel supply system of the fourth embodiment, the fuel supply facility 7 controls the notification apparatus 115 or the gate apparatus 125 to execute the entry restriction control, instead of the central management control facility 8. Therefore, in the fuel supply system of the fourth embodiment, the configuration of the central management control facility 8 is not essential. Hereinafter, the fuel supply system of the fourth embodiment to which the gate apparatus 125 is applied will be described with reference to FIG. 8.

<Configuration of Fuel Supply System>

As illustrated by a dotted line in FIG. 8, the gate apparatus 125 is connected to the fuel supply facility 7, and the control unit 33 connected to the fuel supply facility 7 is capable of controlling the gate apparatus 125. For this reason, the control unit 33 is capable of controlling the opening and closing operations of the gate apparatus 125. In addition, the fuel supply facility 7 includes a communication unit 32. The communication unit 32 is connected to the control unit 33 to perform the radio communication between the control unit 33 of the fuel supply facility 7 and the transport machine 5 and the central management control facility 8 and to perform the transmission and reception of the information such as the fuel amount information and the execution permission information.

Here, the opening and closing operations by the gate apparatus 125 are performed when the transport machine 5 is approaching the gate apparatus 125. For example, the control unit 33 of the fuel supply facility 7 acquires the position information transmitted from the position detection unit 15 of the transport machine 5 and acquires the position information of the gate apparatus 125. Further, the position information of the transport machine 5 may directly be transmitted from the transport machine 5 and may indirectly be transmitted through the central management control facility 8. In addition, the control unit 33 performs the opening and closing operation by the gate apparatus 125 when the distance between the transport machine 5 and the gate apparatus 125 becomes a predetermined distance or less.

The transport machine 5 transmits the loading information detected by the payload meter 51 and the fuel amount information detected by the fuel level gauge 52 to the fuel supply facility 7 through the communication unit 14 and the communication unit 32. The fuel supply facility 7 inputs the fuel amount information and the loading information to the control unit 33 through the communication unit 32. The control unit 33 determines whether or not to supply the fuel to the transport machine 5 based on the acquired fuel amount information when acquiring the input fuel amount information. In addition, the control unit 33 determines whether or not the loads are loaded on the transport machine 5 based on the acquired loading information when acquiring the input loading information.

That is, the control unit 33 controls the gate apparatus 125 to execute the gate restriction control when determining that the loads are loaded on the transport machine 5 based on the acquired loading information. The gate restriction control is executed, and when the distance between the transport machine 5 and the gate apparatus 125 is the predetermined distance or less, the control unit 33 executes the closing operation of the gate bar 125a of the gate apparatus 125.

On the other hand, the control unit 33 controls the gate apparatus 125 to execute the gate allowance control when determining that the loads are not loaded on the transport machine 5 based on the acquired loading information. The gate allowance control is executed, and when the distance between the transport machine 5 and the gate apparatus 125 is the predetermined distance or less, the control unit 33 executes the opening operation of the gate bar 125a of the gate apparatus 125. Further, since the control operation of the fuel supply system of the fourth embodiment is substantially same as in the third embodiment, the description thereof will be not represented.

As described above, even in the fourth embodiment, when the loads are loaded on the transport machine 5, the control unit 33 determines that the fuel supply toward the transport machine 5 is not executable and can restrict the entry of the transport machine 5 to the fuel supply facility 7 by executing the gate restriction control. Therefore, the operator of the transport machine 5 does not need to allow the transport machine 5 to travel toward the fuel supply facility 7, and thus it is possible to restrain the decrease in productivity due to the traveling of the transport machine 5 toward the fuel supply facility 7. Further, the same is applied even in the case of the notification apparatus 115 instead of the gate apparatus 125.

Fifth Embodiment

Figure 9:
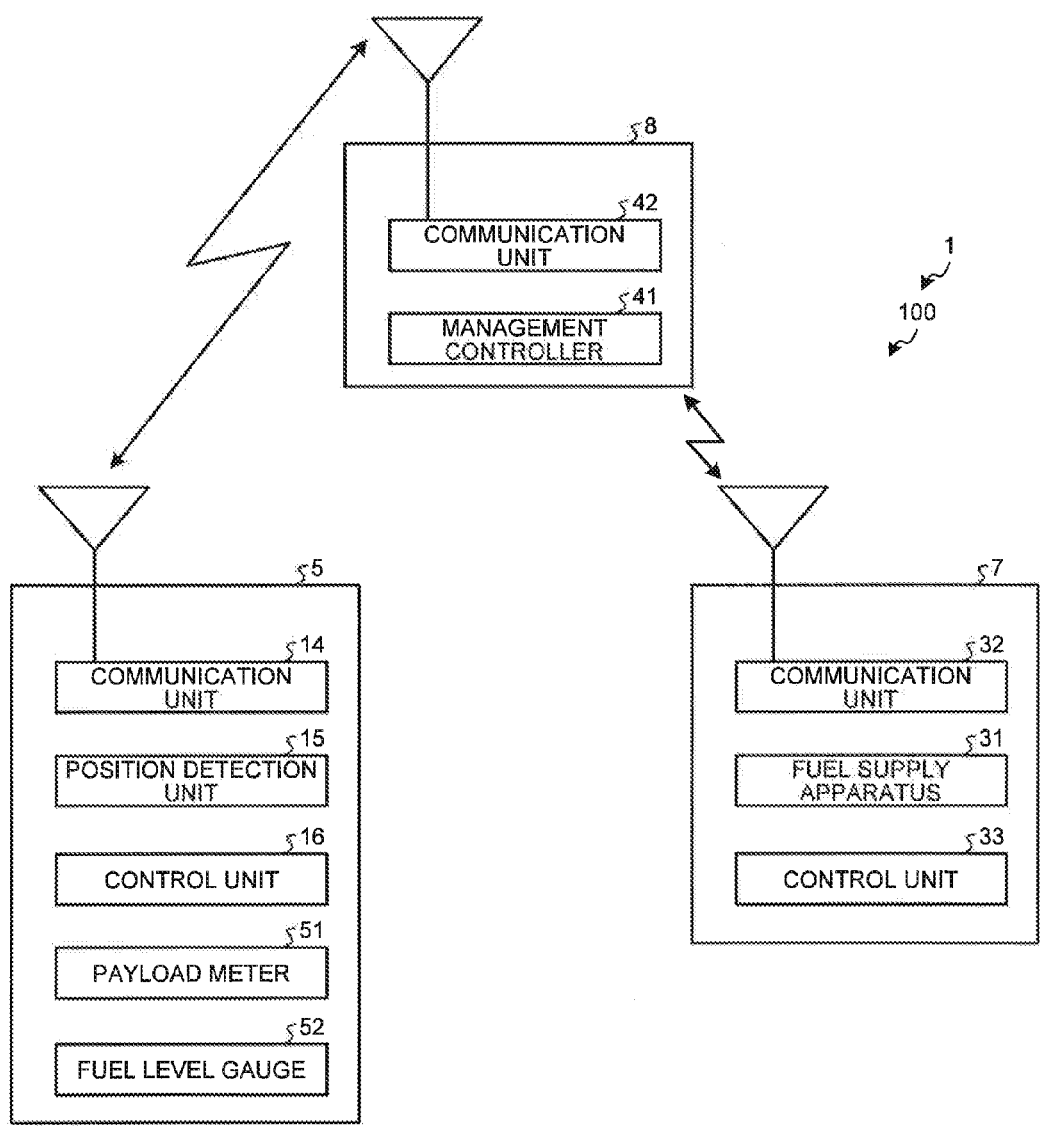
FIG. 9 is a block diagram illustrating a configuration of a fuel supply system of a fifth embodiment.

A fuel supply system 100 of the fifth embodiment will be described below with reference to FIG. 9. FIG. 9 is a block diagram illustrating a configuration of the fuel supply system of the fifth embodiment. Further, even in the fuel supply system 100 of the fifth embodiment, only portions different from those described in the first embodiment will be described so as to avoid the redundant description. A usual (manned) transport machine 5 is used in the fuel supply system 50 of the first embodiment, but an unmanned transport machine 5 is used in the fuel supply system 100 of the fifth embodiment.

<Configuration of Fuel Supply System>

Similarly to the first embodiment, the fuel supply system 100 of the fifth embodiment is incorporated into the load transport system 1 and is made up of the above-described transport machine (earth-moving machine) 5, the fuel supply facility 7, and above-described central management control facility (control apparatus) 8. Further, the fuel supply system 100 of the fifth embodiment is configured not to use the notification apparatus 105 of the first embodiment.

The unmanned transport machine 5 is controlled by the control unit 16 and transports the loads along the predetermined traveling path L in such a way that the control unit 16 controls the operation of each of parts such as the steering and the driving wheels 17 of the transport machine 5 based on the acquired traveling path L and the information such as a goal rate. The control unit 16 is configured to interchange the information with the management controller 41 of the central management control facility 8 through the communication unit 14 of the transport machine 5 and the communication unit 42 of the central management control facility 8. For this reason, the unmanned transport machine 5 is controllable by the management controller 41.

The loading information detected by the payload meter 51 and the fuel amount information detected by the fuel level gauge 52 are input to the management controller 41 of the central management control facility 8 from the transport machine 5 through the communication unit 42. When the management controller 41 determines to supply the fuel to the transport machine 5 based on the acquired fuel amount information, if it is determined that the loads are loaded on the transport machine 5 based on the acquired loading information, the management controller 41 restricts the entry operation of the transport machine 5 to the fuel supply facility 7 to execute the entry operation restricting control for dispatching the transport machine 5 toward the earth discharging area 19 as the entry restriction control. For this reason, the management controller 41 is capable of early eliminating a problem of the loads which becomes a factor against inhibiting the supply of fuel to the transport machine 5. As a result, the fuel supply system 100 can restrain the decrease in productivity of the transport machine 5.

On the other hand, when the management controller 41 determines to supply the fuel to the transport machine 5 based on the acquired fuel amount information, if it is determined that the loads are not loaded on the transport machine 5 based on the acquired loading information, the management controller 41 allows the entry of the transport machine 5 to the fuel supply facility 7 and executes the entry operation allowance control for dispatching the transport machine 5 toward the fuel supply facility 7 as the entry allowance control. For this reason, the management controller 41 is capable of executing smoothly the supply of fuel to the transport machine 5. As a result, the fuel supply system 100 can restrain the decrease in productivity of the transport machine 5.

<Control Operation of Fuel Supply System>

Here, the control operation of the fuel supply system 100 configured as described above will briefly be described. Further, since the control operation of the fuel supply system 100 of the fifth embodiment is the substantially same as that of the fuel supply system 50 of the first embodiment, only portions different from those described in the first embodiment will be described with reference to FIG. 4.

In step S1, the management controller 41 determines whether or not the loads are loaded on the transport machine 5 based on the acquired loading information (step S2) when determining to supply the fuel to the transport machine 5 based on the acquired fuel amount information (Yes in step S1).

When determining that the loads are loaded on the transport machine 5 based on the acquired loading information (Yes in step S2), the management controller 41 executes the entry operation restricting control for restricting the entry operation of the transport machine 5 to the fuel supply facility 7 (step S6: execution of entry restriction control). When the entry operation restricting control is executed, the management controller 41 controls the unmanned transport machine 5 to dispatch the transport machine 5 toward the earth discharging area 19.

Meanwhile, when determining that the loads are not loaded on the transport machine 5 based on the acquired loading information in step S2 (No in step S2), the management controller 41 executes the entry operation allowance control for allowing the entry operation of the transport machine 5 to the fuel supply facility 7 (step S3: execution of entry allowance control). When the entry operation allowance control is executed, the management controller 41 controls the unmanned transport machine 5 to dispatch the transport machine 5 toward the fuel supply facility 7.

As described above, according to the configuration of the fifth embodiment, when the loads are loaded on the transport machine 5, the management controller 41 determines the supply of fuel to the transport machine 5 is not executable and can restrict the entry of the transport machine 5 to the fuel supply facility 7. Therefore, the management controller 41 can restrain the decrease in productivity due to the entry of the transport machine 5 to the fuel supply facility 7.

In addition, according to the fifth embodiment, the management controller 41 can dispatch the transport machine 5 toward the earth discharging area 19 when the loads are loaded on the transport machine 5. For this reason, the management controller 41 is capable of executing promptly the supply of fuel to the transport machine 5 and thus it is possible to achieve the improvement in productivity.

In the configurations of the first to fifth embodiments, further, the payload meter 51 is applied as the load detection apparatus, but an imaging camera (imaging device) may be applied as the load detection apparatus without being limited to these configurations. As will be described briefly below, the imaging camera is provided at the traveling path L1 to take an image of the vessel 12 of the transport machine 5 traveling along the traveling path L1. The imaging camera is configured to transmit the taken image to the central management control facility 8 as the loading information. When acquiring the input loading information, the management controller 41 performs an image analysis of the acquired loading information to determine whether or not the loads are loaded on the transport machine 5. When determining that the loads are loaded on the transport machine 5 based on the acquired loading information, the management controller 41 executes the entry restriction control.

According to this configuration, since the imaging camera may be used instead of the payload meter 51, it is possible to determine visually a presence of the loads loaded on the transport machine 5. Further, the imaging camera is connected to the fuel supply facility 7 and may output the loading information to the control unit 33 of the fuel supply facility 7.

In the configurations of the first to fifth embodiments, further, the payload meter 51 is applied as the load detection apparatus, but a vehicle weight measurement device (weight measurement device) may be applied as the load detection apparatus without being limited to these configurations. As will be described briefly below, the vehicle weight measurement device is provided at the traveling path L1 to measure the vehicle weight of the transport machine 5 traveling along the traveling path L1. The vehicle weight measurement device is configured to transmit the measured vehicle weight to the central management control facility 8 as the loading information. When acquiring the input loading information, the management controller 41 determines whether or not the loads are loaded on the transport machine 5 based on the acquired loading information. When determining that the loads are loaded on the transport machine 5 based on the acquired loading information, the management controller 41 executes the entry restriction control.

According to this configuration, since the vehicle weight measurement device may be used instead of the payload meter 51, it is possible to determine a presence of the loads loaded on the transport machine 5 by the vehicle weight. Further, the vehicle weight measurement device is connected to the fuel supply facility 7 and may output the loading information to the control unit 33 of the fuel supply facility 7.

Sixth Embodiment

Figure 10:
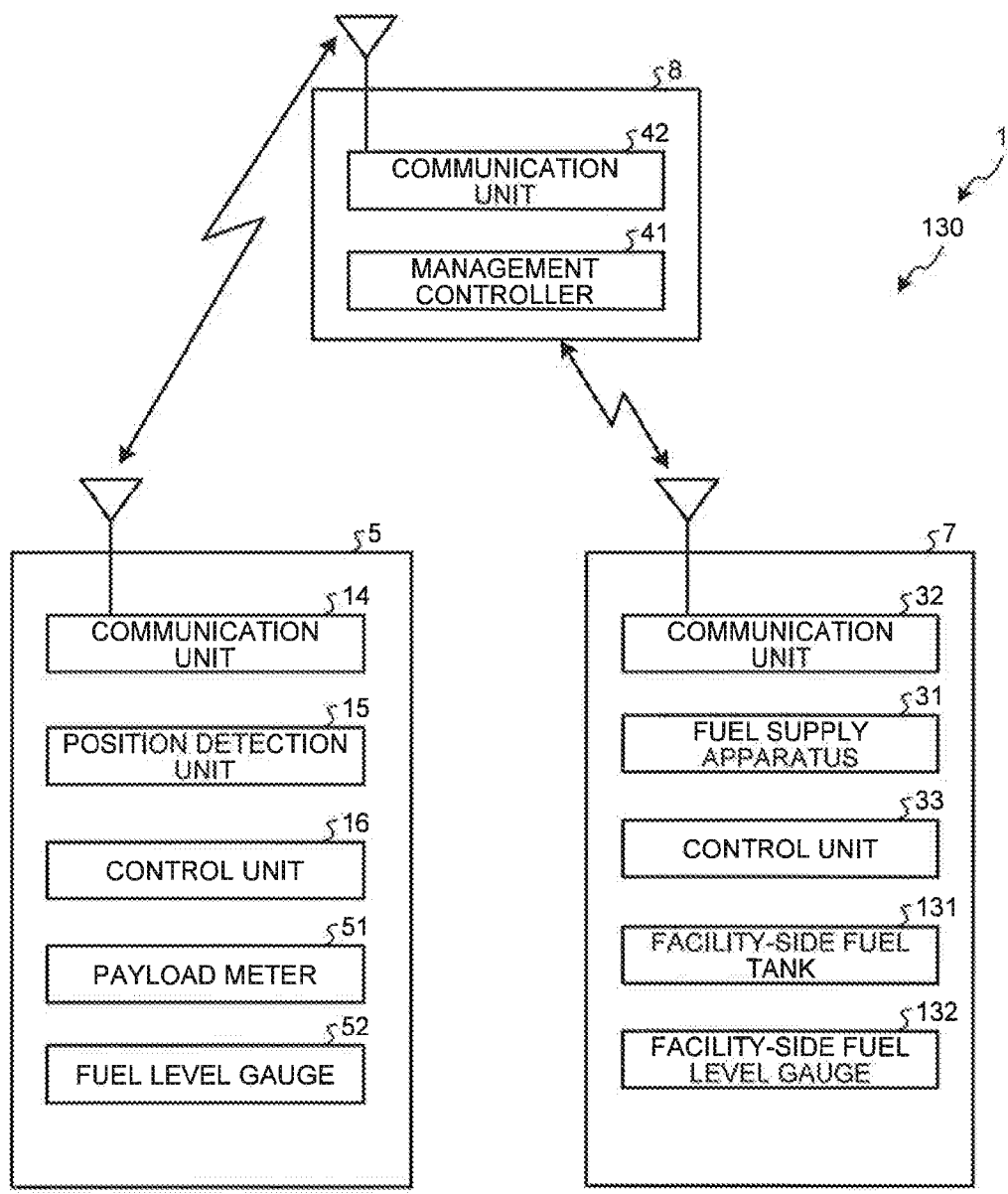
FIG. 10 is a block diagram illustrating a configuration of a fuel supply system of a sixth embodiment.

A fuel supply system 130 of the sixth embodiment will be described below with reference to FIG. 10. FIG. 10 is a block diagram illustrating a configuration of the fuel supply system of the sixth embodiment. Further, even in the fuel supply system 130 of the sixth embodiment, only portions different from those described in the fuel supply system 50 of the first embodiment will be described so as to avoid the redundant description. The fuel supply system 50 of the first embodiment acquires the loading information detected from the payload meter 51 acting as the load detection apparatus as the execution permission information, but the fuel supply system 130 of the sixth embodiment acquires the amount of the fuel of the fuel supply facility 7 as the execution permission information.

<Configuration of Fuel Supply System>

The fuel supply facility 7 further includes the communication unit 32 which is the same as in the fourth embodiment, a facility-side fuel tank 131 for accumulating the fuel, a facility-side fuel level gauge (facility-side fuel amount detection device) 132 for detecting the fuel amount of the facility-side fuel tank 131. The facility-side fuel level gauge 132 is connected to the control unit 33 of the fuel supply facility 7 to output the detected fuel amount to the control unit 33 as facility-side fuel amount information. The control unit 33 transmits the input facility-side fuel amount information to the central management control facility 8 through the communication unit 32 and the communication unit 42, as the execution permission information. When the facility-side fuel amount information is input to the management controller 41 of the central management control facility 8, the management controller 41 determines that the supply of fuel to the transport machine 5 is not executable to execute the entry restriction control when determining that the fuel does not remain in the fuel supply facility 7. On the other hand, the management controller 41 determines that the supply of fuel to the transport machine 5 is executable to execute the entry allowance control when determining that the fuel remains in the fuel supply facility 7. Further, since the control operation of the fuel supply system 130 of the sixth embodiment is the substantially same as in the first embodiment, the description thereof will be not represented.

According to the above-described configuration, when the fuel does not remain in the fuel supply facility 7, the management controller 41 determines that the supply of fuel to the transport machine 5 is not executable and can restrict the entry of the transport machine 5 to the fuel supply facility 7; accordingly, it is possible to restrain the decrease in productivity due to the traveling of the transport machine 5 toward the fuel supply facility 7. In addition, the configuration of the sixth embodiment can be applied to the second and fifth embodiments.

Seventh Embodiment

Figure 11:
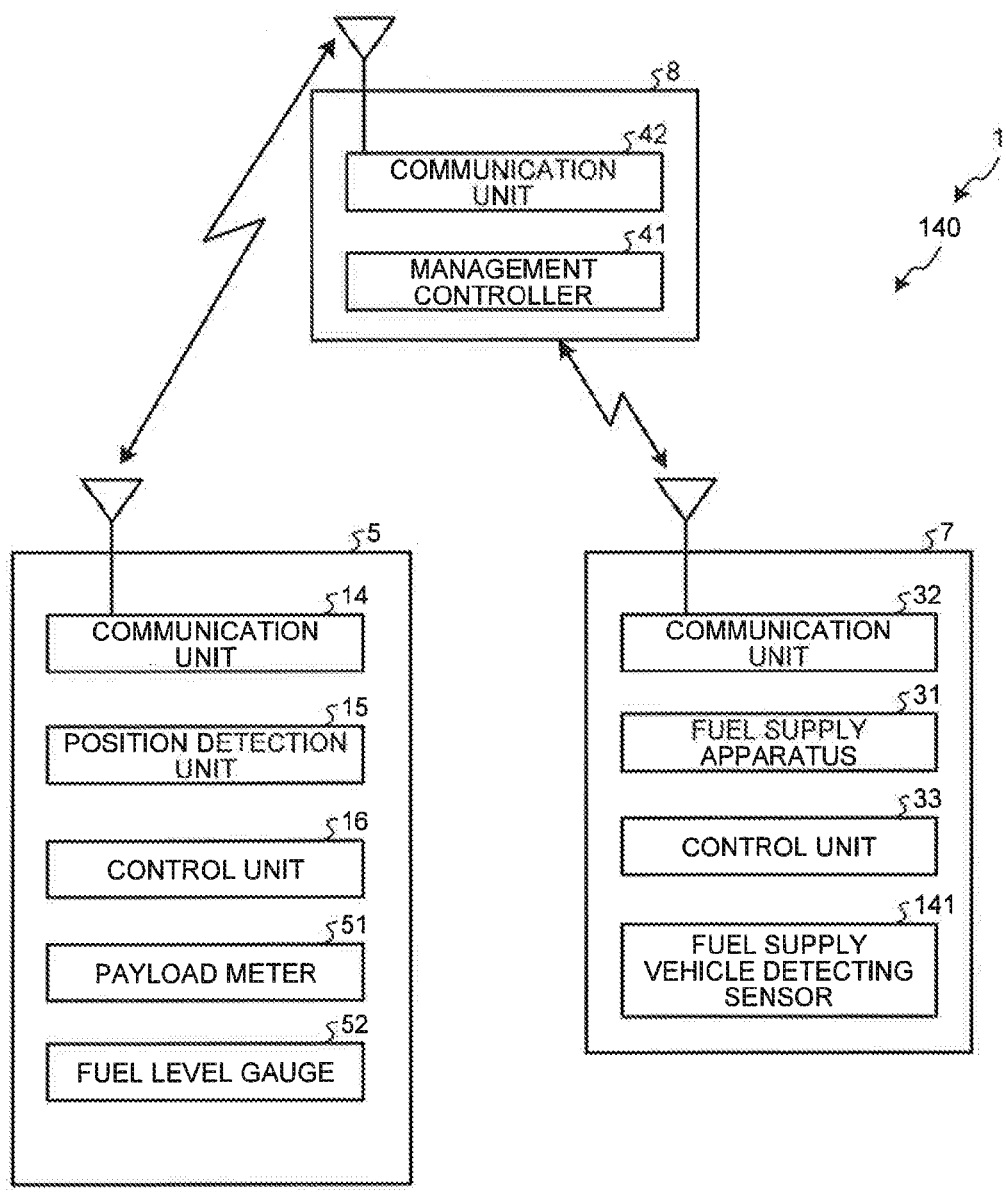
FIG. 11 is a block diagram illustrating a configuration of a fuel supply system of a seventh embodiment.

A fuel supply system 140 of the seventh embodiment will be described below with reference to FIG. 11. FIG. 11 is a block diagram illustrating the fuel supply system of the seventh embodiment. Further, even in the fuel supply system 140 of the seventh embodiment, only portions different from those described in the fuel supply system 50 of the first embodiment will be described so as to avoid the redundant description. The fuel supply system 50 of the first embodiment acquires the loading information detected from the payload meter 51 acting as the load detection apparatus as the execution permission information, but the fuel supply system 140 of the seventh embodiment acquires a presence of the fuel supply vehicle dispatched to the fuel supply facility 7 as the execution permission information.

<Configuration of Fuel Supply System>

The fuel supply vehicle for supplying the fuel to the transport machine 5 is dispatched to the fuel supply facility 7, and the fuel supply facility 7 is provided with a fuel supply vehicle detecting sensor 141 capable of detecting the presence or absence of the fuel supply vehicle as information on the presence or absence of fuel supply vehicle and the communication unit 32 which is the same as in the fourth embodiment. The fuel supply vehicle detecting sensor 141 is connected to the control unit 33 of the fuel supply facility 7 to output the detected presence or absence of the fuel supply vehicle to the control unit 33 as the information on the presence or absence of fuel supply vehicle. The control unit 33 transmits the input information on the presence or absence of fuel supply vehicle to the central management control facility 8 through the communication unit 32 and the communication unit 42, as the execution permission information. When the information on the presence or absence of fuel supply vehicle is input to the management controller 41 of the central management control facility 8, the management controller 41 determines that the supply of fuel to the transport machine 5 is not executable to execute the entry restriction control when determining that the fuel supply vehicle is not present in the fuel supply facility 7. On the other hand, the management controller 41 determines that the supply of fuel to the transport machine 5 is executable to execute the entry allowance control when determining that the fuel supply vehicle is present in the fuel supply facility 7. Further, since the control operation of the fuel supply system 140 of the seventh embodiment is the substantially same as in the first embodiment, the description thereof will be not represented.

According to the above-described configuration, when the fuel supply vehicle is not present in the fuel supply facility 7, since the management controller 41 determines that the supply of fuel to the transport machine 5 is not executable and can restrict the entry of the transport machine 5 to the fuel supply facility 7, it is possible to restrain the decrease in productivity due to the traveling of the transport machine 5 toward the fuel supply facility 7. In addition, the configuration of the seventh embodiment is applicable to the second and fifth embodiments.

Eighth Embodiment

Figure 12:
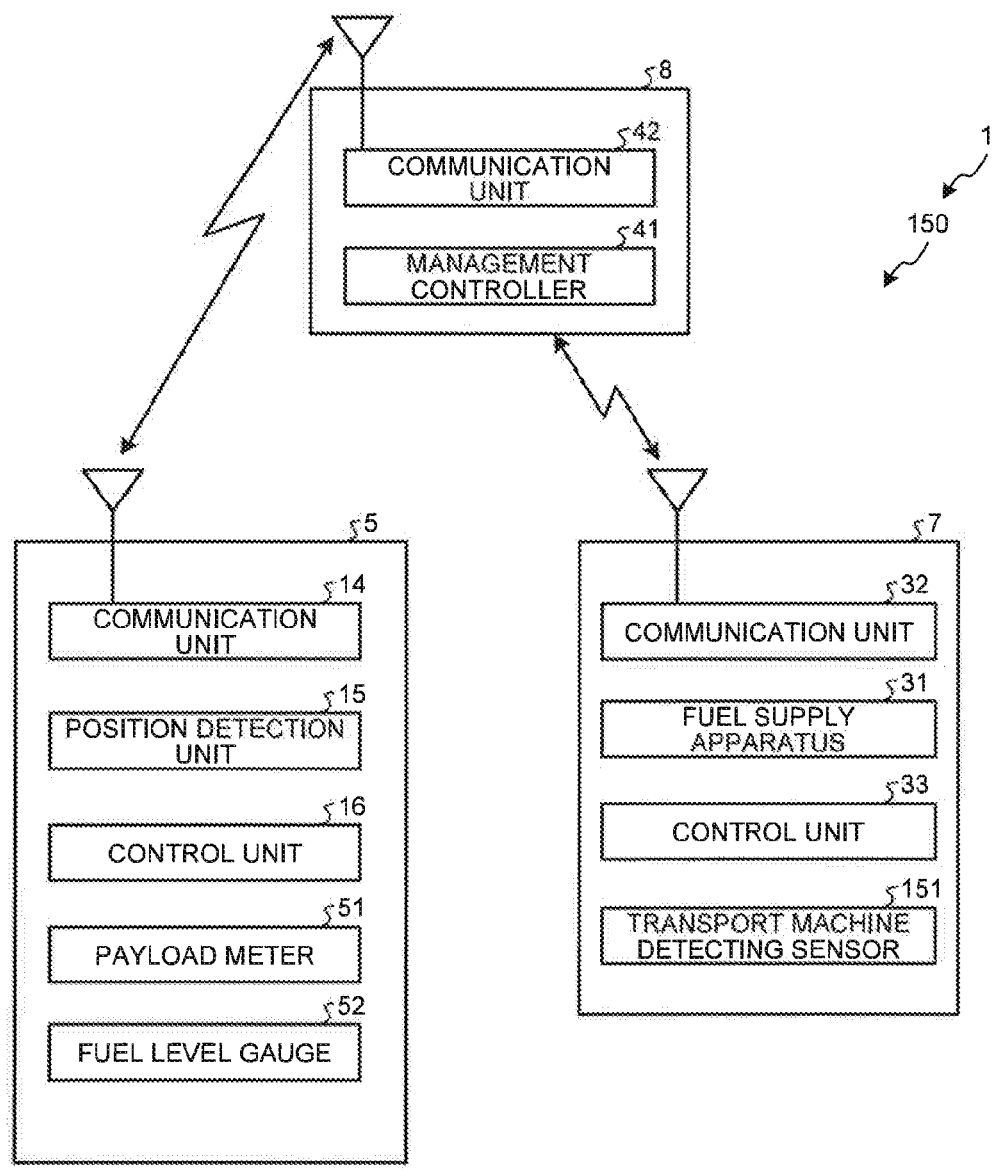
FIG. 12 is a block diagram illustrating a configuration of a fuel supply system of an eighth second embodiment.

A fuel supply system 150 of the eighth embodiment will be described below with reference to FIG. 12. FIG. 12 is a block diagram illustrating the fuel supply system of the eighth embodiment. Further, even in the fuel supply system 150 of the eighth embodiment, only portions different from those described in the fuel supply system 50 of the first embodiment will be described so as to avoid the redundant description. The fuel supply system 50 of the first embodiment acquires the loading information detected from the payload meter 51 acting as the load detection apparatus as the execution permission information, but the fuel supply system 150 of the eighth embodiment acquires the operation status of the fuel supply facility 7 as the execution permission information.

<Configuration of Fuel Supply System>

The transport machine 5 for supplying the fuel to the transport machine 5 is dispatched to the fuel supply facility 7, and the fuel supply facility 7 is provided with an operation-status detection device capable of detecting the operation status within the facility as operation information and the communication unit 32 which is the same as in the fourth embodiment. The operation-status detection device is, for example, a transport machine detecting sensor 151 capable of detecting presence or absence of the transport machine 5 under the fuel supply, and the transport machine detecting sensor 151 is connected to the control unit 33 of the fuel supply facility 7 to output the operation status resulting from the presence or absence of the transport machine 5 as the operation information. The control unit 33 transmits the input operation information to the central management control facility 8 through the communication unit 32 and the communication unit 42, as the execution permission information. When the operation information is input to the management controller 41 of the central management control facility 8, the management controller 41 determines that the supply of fuel to the transport machine 5 is not executable to execute the entry restriction control when determining that the fuel supply facility 7 is in a full state. On the other hand, the management controller 41 determines that the supply of fuel to the transport machine 5 is executable to execute the entry allowance control when determining that the fuel supply facility 7 is not in the full state. Further, since the control operation of the fuel supply system 150 of the eighth embodiment is the substantially same as in the first embodiment, the description thereof will be not represented.

According to the above-described configuration, when the fuel supply facility 7 is in the full state, since the management controller 41 determines that the supply of fuel to the transport machine 5 is not executable and can restrict the entry of the transport machine 5 to the fuel supply facility 7, it is possible to restrain the decrease in productivity due to the traveling of the transport machine 5 toward the fuel supply facility 7. In addition, the configuration of the eighth embodiment is applicable to the second and fifth embodiments.

In the fuel supply system 150 of the eighth embodiment, further, the transport machine detecting sensor 151 is used as the operation-status detection device, but a position detection unit 15 provided in the transport machine 5 may be used without being limited to the above configuration. That is, the management controller 41 can detect the transport machine 5 approaching the fuel supply facility 7 based on the position information to be transmitted from the transport machine 5.

Further, in the configurations of the first to eighth embodiments, the entry restriction control is executed by the management controller 41 of the central management control facility 8 or by the control unit 33 of the fuel supply facility 7, but may be executed by the control unit 16 of the transport machine 5 without being limited to the these configurations. That is, without using the management controller 41 of the central management control facility 8 or the control unit 33 of the fuel supply facility 7, the entry restriction control can be executed by the control unit 16 of the transport machine 5.

Further, in the configurations of the first to eighth embodiments, the fuel supply hose is connected to the fuel supply inlet of the transport machine 5 entered the fuel supply facility 7 by the worker, but may perform an unmanned fuel supply by automating the fuel supply apparatus 31.

Ninth Embodiment

An earth-moving machine of the ninth embodiment will be described below. In addition, the earth-moving machine of the ninth embodiment is incorporated into the load transport system 1 of the first embodiment. Further, similarly to the first embodiment, the transport machine 5 such as the dump truck is applied as the earth-moving machine. The entry restriction control is executed in the fuel supply system 50 of the first embodiment, but the transport machine 5 executes the entry restriction control in the ninth embodiment.

<Configuration of Transport Machine>

Even though not illustrated, the transport machine 5 includes the notification apparatus (notification unit) 105 which is the same as in the first embodiment. That is, the payload meter 51 is connected to the control unit 16 to output the detected loaded amount to the control unit 16 as the loading information. The fuel level gauge 52 is connected to the control unit 16 to output the detected fuel amount to the control unit 16 as the fuel amount information. The notification apparatus 105 is, for example, a display monitor and is provided in the operator's cab of the transport machine 5 to notify the operator of the information.

When the control unit 16 of the transport machine 5 determines to supply the fuel based on the acquired fuel amount information, if it is determined that the loads are loaded on the vessel 12 from the acquired loading information, the control unit 16 determines that the supply of fuel to the transport machine 5 is not executable and executes the entry restriction notifying control for notifying the notification apparatus 105 of warning information on the restriction of the entry to the fuel supply facility 7. On the other hand, when the control unit 16 of the transport machine 5 determines to supply the fuel based on the acquired fuel amount information, if it is determined that the loads are not loaded on the vessel 12 based on the acquired loading information, the control unit 16 determines that the supply of fuel to the transport machine 5 is executable and executes the entry allowance notifying control for notifying the notification apparatus 105 of entry permission information on the allowance of the entry to the fuel supply facility 7.

<Control Operation of Transport Machine>

Here, the control operation of the transport machine 5 configured as described above will briefly be described. Further, since the control operation of the transport machine 5 of the ninth embodiment is the substantially same as that of the fuel supply system 50 of the first embodiment, only portions different from those described in the first embodiment will be described with reference to FIG. 4.

The control unit 16 of the transport machine 5 acquires the fuel amount information detected by the fuel level gauge 52 and the loading information detected by the payload meter 51. Then, the control unit 16 determines whether or not to supply the fuel to the transport machine 5 based on the acquired fuel amount information (step S1). In step S1, when determining to supply the fuel to the transport machine 5 based on the acquired fuel amount information (Yes in step S1), the control unit 16 determines whether or not the loads are loaded on the transport machine 5 based on the acquired loading information (step S2).

When determining that the loads are loaded on the vessel 12 based on the acquired loading information (Yes in step S2), the control unit 16 executes the entry restriction notifying control for notifying the operator of the warning information (step S6: entry restriction control). When the entry restriction notifying control is executed, the control unit 16 displays the warning information on the notification apparatus 105. On the other hand, when determining not to load the loads on the vessel 12 based on the acquired loading information in step S2 (No in step S2), the control unit 16 executes the entry allowance notifying control for notifying the operator of the permission information (step S3: entry allowance control). When the entry allowance notifying control is executed, the control unit 16 displays the permission information on the notification apparatus 105.

As described above, according to the configuration of the ninth embodiment, when the loads are loaded on the vessel 12, the control unit 16 of the transport machine 5 can notify the operator of the warning information that the supply of fuel to the transport machine 5 is not executable, from the notification apparatus 105. Therefore, the operator of the transport machine 5 allows the transport machine 5 not to travel toward the fuel supply facility 7 but to travel toward the earth discharging area 19, and thus it is possible to restrain the decrease in productivity due to the traveling of the transport machine 5 toward the fuel supply facility 7. In addition, since the transport machine 5 performs independently the entry restriction control, it is possible to provide a simplified configuration.

Tenth Embodiment

An earth-moving machine of the tenth embodiment will be described below. Similarly to the first embodiment, further, the earth-moving machine of the tenth embodiment is applied to the transport machine 5 such as the dump truck and only portions different from those described in the ninth embodiment are described so as to avoid the redundant description. The transport machine 5 of the ninth embodiment is a usual (manned) transport machine 5 capable of executing the entry restriction control, but the transport machine 5 of the tenth embodiment is an unmanned transport machine 5 capable of executing the entry restriction control.

<Configuration of Transport Machine>

Even though not illustrated, the transport machine 5 is the same configuration as the first embodiment and includes the vehicle body 11, the vessel 12, the communication unit 14, the position detection unit 15, the control unit 16, the payload meter 51, and the fuel level gauge 52. The payload meter 51 is connected to the control unit 16 to output the detected loaded amount to the control unit 16 as the loading information. The fuel level gauge 52 is connected to the control unit 16 to output the detected fuel amount to the control unit 16 as the fuel amount information.

When the control unit 16 of the transport machine 5 determines to supply the fuel based on the acquired fuel amount information, if it is determined that the loads are loaded on the vessel 12 based on the acquired loading information, the control unit 16 determines that the supply of fuel to the transport machine 5 is not executable and restricts the entry operation to the fuel supply facility 7 to execute the entry operation restricting control for traveling toward the earth discharging area 19. On the other hand, when the control unit 16 of the transport machine 5 determines to supply the fuel based on the acquired fuel amount information, if it is determined that the loads are not loaded on the vessel 12 based on the acquired loading information, the control unit 16 allows the entry operation to the fuel supply facility 7 to execute the entry operation allowing control for traveling toward the fuel supply facility 7.

<Control Operation of Transport Machine>

Here, the control operation of the transport machine 5 configured as described above will briefly be described. Further, since the control operation of the transport machine 5 of the tenth embodiment is the substantially same as that of the fuel supply system 50 of the first embodiment, only portions different from those described in the first embodiment will be described with reference to FIG. 4.

The control unit 16 of the transport machine 5 acquires the fuel amount information detected by the fuel level gauge 52 and the loading information detected by the payload meter 51. Then, the control unit 16 determines whether or not to supply the fuel to the transport machine 5 based on the acquired fuel amount information (step S1). In step S1, when determining to supply the fuel to the transport machine 5 based on the acquired fuel amount information (Yes in step S1), the control unit 16 determines whether or not the loads are loaded on the transport machine 5 based on the acquired loading information (step S2).

When determining that the loads are loaded on the vessel 12 based on the acquired loading information (Yes in step S2), the control unit 16 executes the entry operation restricting control for restricting the entry operation to fuel supply facility 7 (step S6: entry restriction control). When executing the entry operation restricting control, the control unit 16 allows the vehicle body 11 to travel toward the earth discharging area 19. On the other hand, when determining that the loads are not loaded on the vessel 12 based on the acquired loading information in step S2 (No in step S2), the control unit 16 executes the entry operation allowing control for allowing the entry operation to the fuel supply facility 7 (step S3: entry allowance control). When executing the entry operation allowing control, the control unit 16 allows the vehicle body 11 to travel toward fuel supply facility 7.

As described above, according to the configuration of the tenth embodiment, when the loads are loaded on the vessel 12, the control unit 16 of the transport machine 5 determines that the supply of fuel to the transport machine 5 is not executable and can restrict the entry to the fuel supply facility 7. Therefore, the control unit 16 can restrict the entry of the transport machine 5 to the fuel supply facility 7, and thus it is possible to restrain the decrease in productivity due to the traveling of the transport machine 5 toward the fuel supply facility 7. In addition, since the transport machine 5 performs independently the entry restriction control, it is possible to provide a simplified configuration. Further, since the transport machine 5 does not enter the fuel supply facility 7 in a loaded state of the loads, it is possible to restrain the damage to the fuel supply facility 7 due to the falling of the loads.

Further, in the configurations of the first to tenth embodiments, the transport machine 5 is applied to the transport machine 5 having an engine and a motor as a power source, but may be applied to the transport machine 5 having only the engine as the power source and the transport machine 5 having only the motor, which drives using the engine, as the power source, without being limited to the above configuration.

Further, in the configurations of the first to tenth embodiments, it is determined whether or not the fuel is supplied to the transport machine 5 using the fuel level gauge 52, but may be determined whether or not the fuel is supplied to the transport machine 5 using the management controller 41 for managing the operation status of the transport machine 5 instead of the fuel level gauge 52, without being limited to the above configuration. More specifically, the management controller 41 manages the elapsed time from the time when the transport machine 5 supplies previous fuel up to the present, as the operation status of the transport machine 5. Then, the management controller 41 determines to supply the fuel to the transport machine 5 when the elapsed time exceeds a set time which is set in advance, while the management controller 41 determines not to supply the fuel to the transport machine 5 when the elapsed time does not exceed the set time which is set in advance. In this configuration, the management controller 41 can also determine whether or not to supply the fuel to the transport machine 5.

In addition, with respect to the fuel supply system of the first to eighth embodiments, each of the components may appropriately be combined, and similarly, with respect to the transport machine of the ninth and tenth embodiments, each of the components may appropriately be combined. For example, the fuel supply system may be configured in combination with the notification apparatus 105 described in the first embodiment and the gate apparatus 125 described in the third embodiment.

REFERENCE SIGNS LIST

1 LOAD TRANSPORT SYSTEM
5 TRANSPORT MACHINE
7 FUEL SUPPLY FACILITY
8 CENTRAL MANAGEMENT CONTROL FACILITY
11 VEHICLE BODY
12 VESSEL
14 COMMUNICATION UNIT
15 POSITION DETECTION UNIT
16 CONTROL UNIT
17 DRIVING WHEEL
18 LOADING AREA
19 EARTH DISCHARGING AREA
31 FUEL SUPPLY APPARATUS
32 COMMUNICATION UNIT
33 CONTROL UNIT

41 MANAGEMENT CONTROLLER
42 COMMUNICATION UNIT
50 FUEL SUPPLY SYSTEM
51 PAYLOAD METER
52 FUEL LEVEL GAUGE
100 FUEL SUPPLY SYSTEM (FIFTH EMBODIMENT)
105 NOTIFICATION APPARATUS
110 FUEL SUPPLY SYSTEM (SECOND EMBODIMENT)
115 NOTIFICATION APPARATUS (SECOND EMBODIMENT)
116 COMMUNICATION UNIT (SECOND EMBODIMENT)
120 FUEL SUPPLY SYSTEM (THIRD EMBODIMENT)
125 GATE APPARATUS (THIRD EMBODIMENT)
126 COMMUNICATION UNIT (THIRD EMBODIMENT)
130 FUEL SUPPLY SYSTEM (SIXTH EMBODIMENT)
131 FACILITY-SIDE FUEL TANK (SIXTH EMBODIMENT)
132 FACILITY-SIDE FUEL LEVEL GAUGE (SIXTH EMBODIMENT)
140 FUEL SUPPLY SYSTEM (SEVENTH EMBODIMENT)
141 FUEL SUPPLY VEHICLE DETECTING SENSOR (SEVENTH EMBODIMENT)
150 FUEL SUPPLY SYSTEM (EIGHTH EMBODIMENT)
151 TRANSPORT MACHINE DETECTING SENSOR (EIGHTH EMBODIMENT)
L TRAVELING PATH
L1 TRAVELING PATH
L2 TRAVELING PATH

The invention claimed is:

1. A fuel supply system comprising:
a fuel supply facility having a control unit and a fuel supply apparatus configured to supply fuel;
an earth-moving machine configured to travel toward the fuel supply facility, the earth-moving machine including a loading unit that loads a load;
a load detection device configured to detect whether or not the load is loaded on the loading unit, as loading information;
a fuel level gauge configured to detect a fuel amount of the earth-moving machine; and
a control apparatus that acquires execution permission information indicating whether or not fuel can be supplied to the earth-moving machine,
wherein the control apparatus acquires the loading information as the execution permission information, and when the control apparatus determines that the load is loaded on the loading unit based on the loading information, the control apparatus is configured to determine that fuel cannot be supplied to the earth-moving machine even when it is detected that fuel needs to be supplied to the earth-moving machine by using the fuel level gauge, and to execute an entry restriction control which restricts entry to the fuel supply facility by the earth-moving machine such that the earth-moving machine does not enter the fuel supply facility in a loaded state of the load.

2. The fuel supply system according to claim 1, wherein the control apparatus controls the earth-moving machine to execute entry operation restricting control for restricting an entry operation of the earth-moving machine, which enters the fuel supply facility, as the entry restriction control.

3. The fuel supply system according to claim 1, further comprising:
a notification apparatus configured to display information received at the earth-moving machine from the control apparatus,
wherein the control apparatus controls the notification apparatus to execute entry restriction notifying control for notifying the earth-moving machine of warning information on the restriction of the entry to the fuel supply facility by the earth-moving machine, as the entry restriction control.

4. The fuel supply system according to claim 1, further comprising:
a gate apparatus that restricts the entry of the earth-moving machine to the fuel supply facility,
wherein the control apparatus controls the gate apparatus to execute gate restriction operating control to restrict the entry of the earth-moving machine to the fuel supply facility, as the entry restriction control.

5. The fuel supply system according to claim 1, wherein the load detection device includes at least one of a loaded-amount detection device that detects a loaded amount of the load which is loaded on the loading unit, an imaging device that takes an image of the load which is loaded on the earth-moving machine, and a weight measurement device that measures a weight of the earth-moving machine.

6. The fuel supply system according to claim 1, wherein the control apparatus dispatches the earth-moving machine toward an unloading area when the control apparatus determines that the load is loaded on the loading unit based on the loading information and dispatches the earth-moving machine toward the fuel supply facility when the control apparatus determines that the load is not loaded on the loading unit based on the loading information.

7. The fuel supply system according to claim 1, wherein the fuel supply facility includes a facility-side fuel tank that accumulates fuel and a facility-side fuel amount detector configured to detect an amount of the fuel accumulated in the facility-side fuel tank, as facility-side fuel amount information, and
the control apparatus acquires the facility-side fuel amount information as the execution permission information and when the control apparatus determines that fuel does not remain based on the facility-side fuel amount information, the control apparatus determines that fuel cannot be supplied to the earth-moving machine to execute the entry restriction control.

8. The fuel supply system according to claim 1, wherein the fuel supply facility includes a fuel supply-vehicle presence detector configured to detect a presence or absence of a fuel supply vehicle that supplies the fuel to the earth-moving machine, as fuel supply-vehicle presence information, and
the control apparatus acquires the fuel supply-vehicle presence information as the execution permission information and when the control apparatus determines that the fuel supply vehicle is not present in the fuel supply facility based on the fuel supply-vehicle presence information, the control apparatus determines that fuel cannot be supplied to the earth-moving machine to execute the entry restriction control.

9. The fuel supply system according to claim 1, wherein the fuel supply facility includes an operation status detector configured to detect an operation status of the fuel supply facility due to the supply of the fuel to the earth-moving machine, as operation information, and the control apparatus acquires the operation information as the execution permission information and when the control apparatus determines that the fuel supply facility is in a full state based on the operation information, the control apparatus determines that fuel cannot be supplied to the earth-moving machine to execute the entry restriction control.

10. An earth-moving machine configured to travel toward a fuel supply facility that supplies fuel, the machine comprising:
   a loading unit that loads a load;
   a load detector configured to detect whether or not the load is loaded on the loading unit, as loading information;
   a fuel level gauge configured to detect a fuel amount of the earth-moving machine; and
   a control unit that acquires execution permission information indicating whether or not fuel can be supplied to the earth-moving machine,
   wherein the control unit acquires the loading information as the execution permission information, and when the control unit determines that the load is loaded on the loading unit based on the loading information, the control unit is configured to determine that fuel cannot be supplied to the earth-moving machine even when it is detected that fuel needs to be supplied to the earth-moving machine by using the fuel level gauge, and to execute an entry restriction control which restricts entry of the earth-moving machine to the fuel supply facility such that the earth-moving machine does not enter the fuel supply facility in a loaded state of the load.

11. The earth-moving machine according to claim 10, wherein the control unit executes entry operation restricting control for restricting an entry operation of entering the fuel supply facility, as the entry restriction control.

12. The earth-moving machine according to claim 10, further comprising:
   a notification unit configured to display information received at the earth-moving machine,
   wherein the control unit controls the notification unit to execute entry restriction notifying control for notifying an operator of warning information on the restriction of the entry to the fuel supply facility, as the entry restriction control.

13. The earth-moving machine according to claim 10, wherein when the control unit determines that the load is loaded on the loading unit based on the loading information, the control unit dispatches the earth-moving machine toward an unloading area and when the control unit determines that the load is not loaded on the loading unit based on the loading information, the control unit dispatches the earth-moving machine toward the fuel supply facility.

* * * * *